United States Patent [19]
Takahashi et al.

[11] Patent Number: 5,327,158
[45] Date of Patent: Jul. 5, 1994

[54] VIDEO PROCESSING APPARATUS

[75] Inventors: Toyofumi Takahashi; Michitaka Miyoshi, both of Tokyo; Masahiro Otake; Satoshi Nishiumi, both of Kyoto, all of Japan

[73] Assignees: Ricoh Co., Ltd., Tokyo; Nintendo Co., Ltd., Kyoto, both of Japan

[21] Appl. No.: 651,265

[22] PCT Filed: Jul. 26, 1990

[86] PCT No.: PCT/JP90/00958
§ 371 Date: Apr. 10, 1991
§ 102(e) Date: Apr. 10, 1991

[87] PCT Pub. No.: WO91/02345
PCT Pub. Date: Feb. 21, 1991

[30] Foreign Application Priority Data
Aug. 1, 1989 [JP] Japan ................................. 1-200073

[51] Int. Cl.⁵ .................................................. G09G 1/06
[52] U.S. Cl. ................................ 345/126; 345/127; 345/114; 273/85 G; 273/DIG. 28
[58] Field of Search ............... 340/731, 725, 727, 735; 273/85 G, 434, DIG. 28, 313; 358/22, 183; 345/126, 127, 129, 130, 114

[56] References Cited
U.S. PATENT DOCUMENTS

| | | | |
|---|---|---|---|
| 4,026,555 | 5/1977 | Kirschner et al. | 340/725 |
| 4,398,189 | 8/1983 | Pasierb, Jr. et al. | 340/727 |
| 4,580,782 | 4/1986 | Ochi | 273/85 G |
| 4,593,407 | 6/1986 | Konishi et al. | 340/727 |
| 4,602,286 | 7/1986 | Kellar et al. | 358/22 |
| 4,672,541 | 6/1987 | Bromley et al. | 273/85 G |
| 4,754,270 | 6/1988 | Murauchi | 340/735 |
| 4,824,106 | 4/1989 | Ueda et al. | 273/434 |
| 4,850,028 | 7/1989 | Kawamura et al. | 382/46 |
| 4,895,376 | 1/1990 | Chiang Shiung-Fei | 340/727 |

FOREIGN PATENT DOCUMENTS
0014045 8/1980 European Pat. Off. .
0128789 12/1984 European Pat. Off. .

Primary Examiner—Ulysses Weldon
Assistant Examiner—Matthew Luu
Attorney, Agent, or Firm—Nixon & Vanderhye

[57] ABSTRACT

A video processing apparatus includes a VRAM in which image data of an original background picture is stored. An address of the VRAM in a case where the original background picture is rotated and enlarged or reduced is calculated by a background picture address control circuit on the basis of constants set by a CPU. Color data of the background picture at the time of rotation processing and enlargement or reduction processing is read from the address of the VRAM, and a video signal is generated by the color data.

27 Claims, 14 Drawing Sheets

FIG. 6
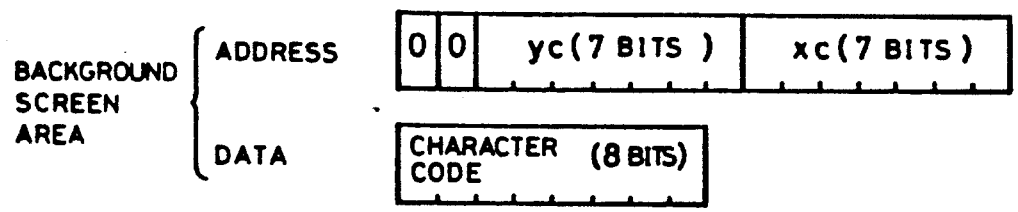
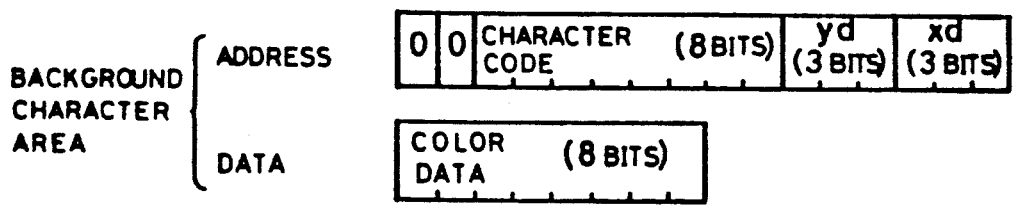
FIG. 7
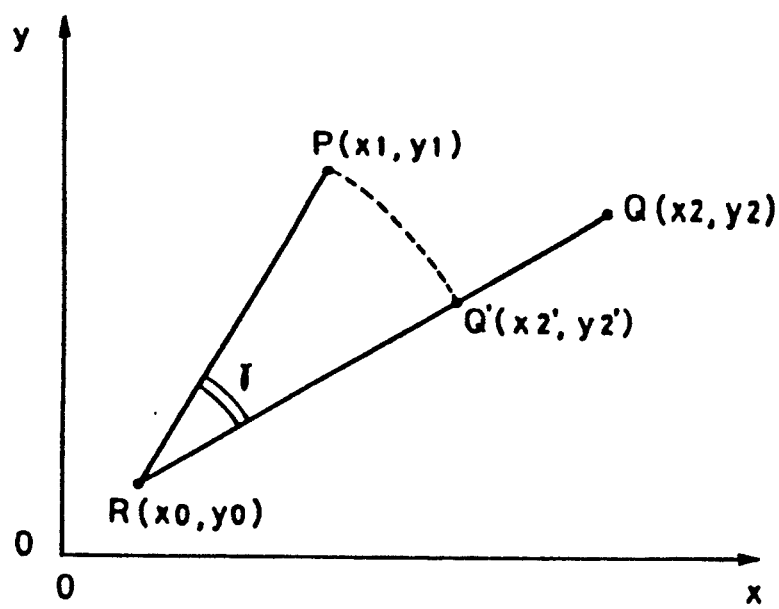

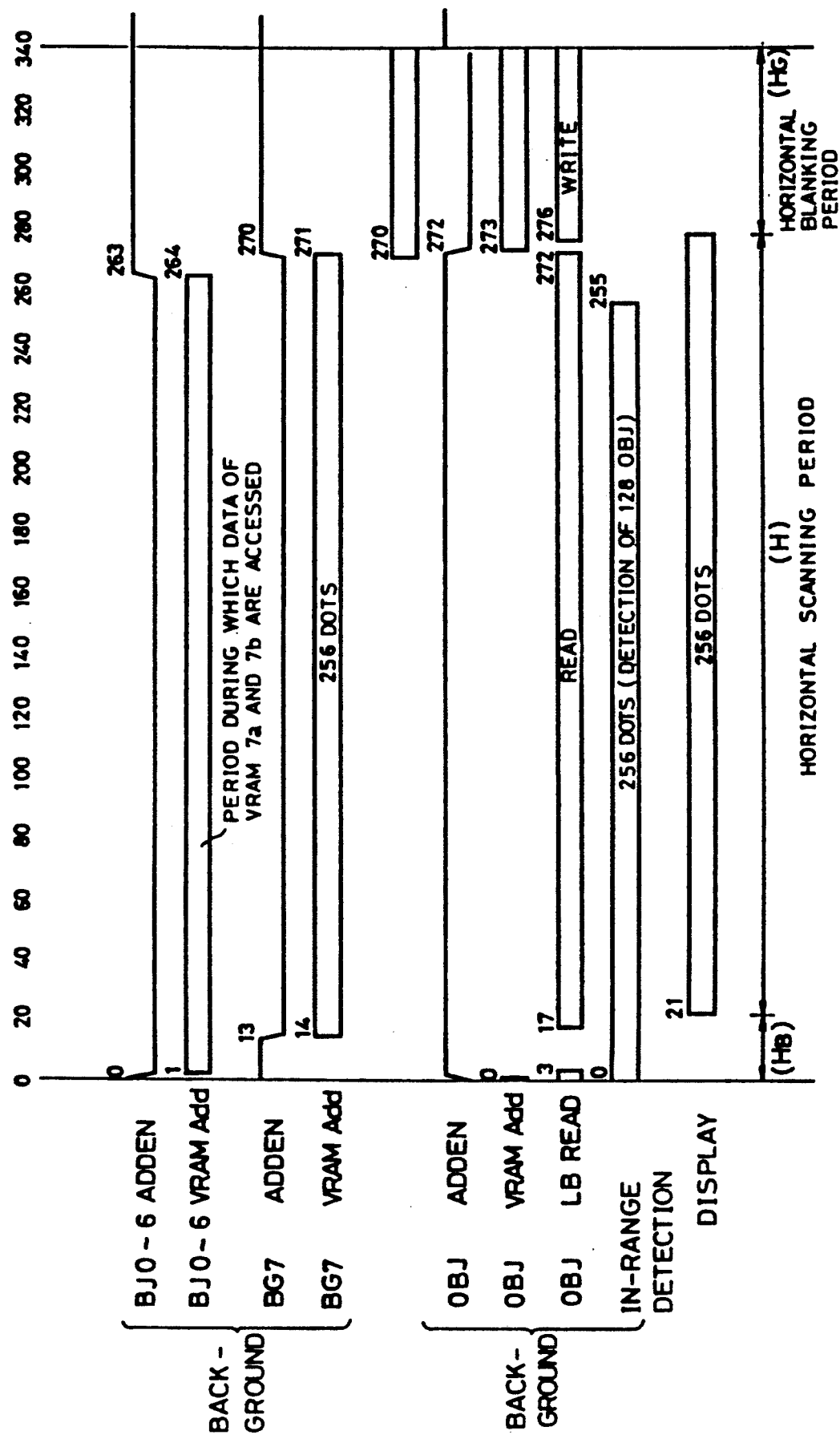

F I G. 14
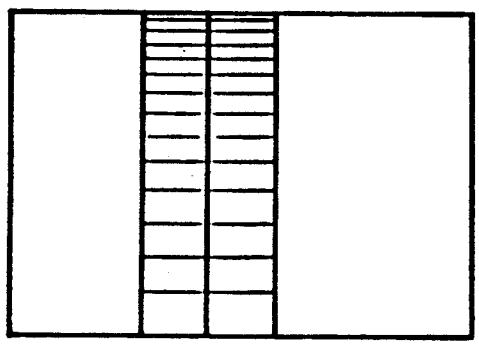
F I G. 15
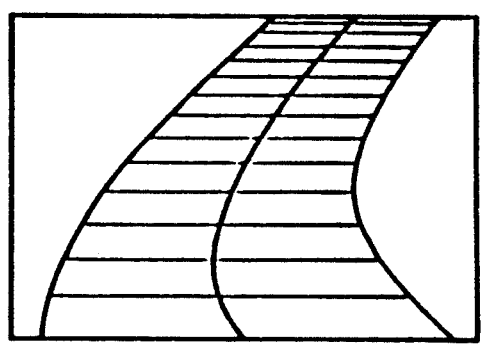
F I G. 16
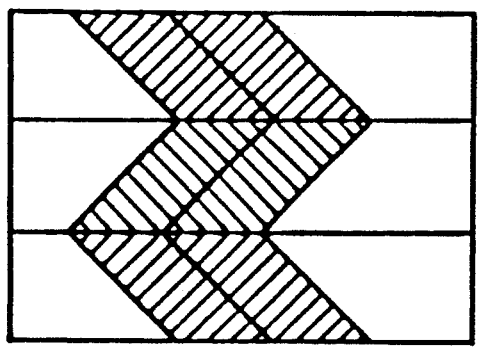

F I G. 17
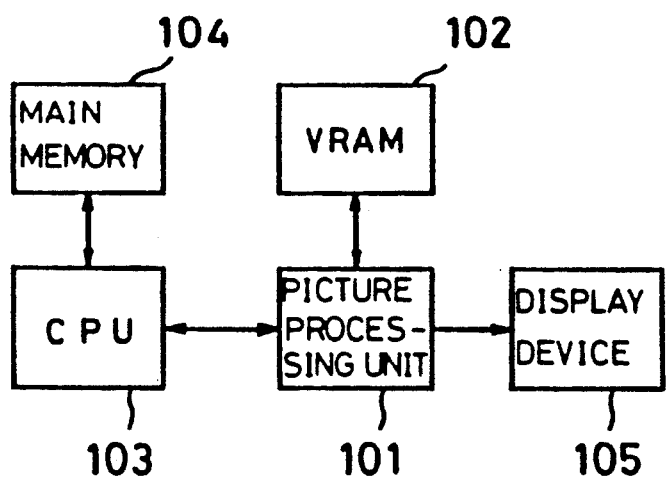

VIDEO PROCESSING APPARATUS

FIELD OF THE INVENTION

The present invention generally relates to a video processing apparatus for use with a television set or the like which can process and display not only moving picture character symbols but also a background picture (or a still picture).

PRIOR ART

Techniques for rotating a moving picture character symbol are well known. For example, video games such as Space War and Computer Space providing rotation of moving character symbols have been widely played for decades. Japanese Patent Publication No. 45,225/1980 and Japanese Patent Laid-Open Gazette No. 113,529/1976 (counterpart to U.S. Pat. No. 4,026,555) also disclose moving picture symbol rotation.

Techniques for rotating a background picture are also known. An exemplary such prior art system may be represented by the block diagram shown in FIG. 17. In the block diagram shown in FIG. 17, a video RAM (referred to as "VRAM" hereinafter) 102 comprising a random access memory (referred to as "RAM" hereinafter) as well as a CPU 103 are connected to a picture processing unit 101. A main memory 104, storing image data for a background picture, moving picture character symbols, and control data for displaying and controlling the image data, is connected to the CPU 103. The image data stored in the main memory 104 are transferred to the VRAM 102 through the picture processing unit 101. On the basis of the control data from the CPU 103, the picture processing unit 101 reads data from the VRAM 102 and outputs the data as a video signal to a display device 105. Display device 105 displays an image according to the data. Addresses of the VRAM 102 correspond to positions in the horizontal and vertical directions of the image displayed on the display device 105. The above described moving picture character symbol image data and/or the background picture data are stored in respective addresses of the VRAM 102.

The above-described conventional television video game system is capable of rotating, enlarging or reducing background pictures for display. When a predetermined background picture is rotated, [or] enlarged, or reduced and displayed on the display device 105, the CPU 103 calculates (during a vertical blanking period), a new horizontal position and a new vertical position on the basis of an original position in the horizontal direction (referred to as "horizontal position" hereinafter) and an original position in the vertical direction (referred to as "vertical position" hereinafter) on a display screen of the image data of the original background picture stored in the VRAM 102. The CPU 103 then writes the image data of the original background picture into addresses of the VRAM 102 which corresponds to the new horizontal position and the new vertical position as calculated. Thereafter, during horizontal scanning, the picture processing unit 102 sequentially converts the data written in the VRAM 102 into a video signal and outputs the same to the display device 105.

Techniques for enlarging or reducing a background picture such as that disclosed in Japanese Patent Laid-Open Gazette No. 172088/1985 (counterpart to U.S. Pat. No. 4,754,270) are also known.

The technique disclosed in Japanese Patent Publication No. 45225/1980 or Japanese Patent Laid-Open Gazette No.113529/1976 for rotating a moving picture character symbol cannot be used for the rotation of a background picture.

The above-described prior art shown in FIG. 17 has the following disadvantage: When a background picture is to be rotated or enlarged or reduced and displayed, the CPU 103 must calculate the new horizontal and vertical positions. The rotation processing or the enlargement or reduction processing of the background picture typically takes a relatively long time. Accordingly, the throughput of the CPU 103 is reduced since the CPU 103 cannot perform very much other video processing.

Additionally, when the background picture is subjected to rotation processing or enlargement or reduction processing as described above, the image data of the background picture stored in the VRAM 102 is rewritten. Accordingly, the image data of the original background picture before rotation processing (or the enlargement or reduction processing) typically cannot be preserved. Therefore, for example, when the original background picture is repeatedly rotated through 30° at a time and consequently, the original background picture is rotated through a total of 360° (one rotation), any any computing errors at the time of respective rotations accumulate so that a background picture is displayed in coordinate positions different from that of the original background picture and may be displayed as a figure having a shape different from that of the original background picture. Since the original background picture is not preserved as described above, such prior art has the disadvantage in that a background picture having the same shape as that of the original background picture may not be displayed in the original exact position.

The technique disclosed in Japanese Patent Laid-Open Gazette No. 172088/1985 has disadvantages in that a background picture cannot be enlarged or reduced while being rotated. Moreover, rotation processing and enlargement or reduction processing cannot be achieved in a common circuit.

SUMMARY OF THE INVENTION

An important object of the present invention is to provide a video processing apparatus capable of displaying a background picture having the same shape as that of the original background picture without deformation after rotation.

Another object of the present invention is to provide a video processing apparatus capable of performing rotation, enlargement and/or reduction processing of a background picture at relatively high speed without burdening a CPU while reproducing the original background picture without deformation.

Still another object of the present invention is to provide a video processing apparatus capable of achieving enlargement or reduction processing while rotating a background picture.

The present invention provides a storage device for storing image data of a background picture in address locations corresponding to display positions of the background picture before rotation processing. An operation means operates, on the basis of rotation processing control data, on an address of the storage device corresponding to a display position of the background picture after performing background picture rotation processing. A reading arrangement reads image data stored in addresses of the storage device specified by the operation means. Video signal generating means generates a video signal on the basis of the image data read by the reading arrangement.

In accordance with another aspect of the present invention, there is provided a storage means for storing image data representing a background picture in address locations corresponding to display positions before rotation, enlargement and reduction processing. Operation means operate, on the basis of control data for rotation, enlargement, or reduction processing. The operating means operate on an address of the storage means corresponding to a display position of the background picture after rotation, enlargement or reduction processing of the background picture. A reading means reads the image data stored in the address of the storage means which is operated upon by the operation means. Video signal generating means generates a video signal on the basis of the image data read by the reading means.

By the above described construction, the storage means stores, before rotation (and/or enlargement or reduction) processing of a picture, image data representing the picture in an address corresponding to a display position of the picture before rotation (and/or enlargement or reduction) processing.

Then, in the rotation (and/or enlargement or reduction) processing of a picture, the operation means operates on an address of the storage means corresponding to a display position of the picture after performing the rotation (and/or enlargement or reduction) processing on the basis of the control data for the rotation (and/or enlargement or reduction) processing. The reading means then reads the image data stored in the address of the storage means which is operated on by the operation means, and the video signal generating means generates a video signal on the basis of the image data read by the reading means. Consequently, a video signal at the time of performing at least one of the rotation processing and the enlargement or reduction processing of the picture is obtained according to the image data stored in the storage means.

According to the present invention, a background picture having the same shape as that of the original background picture can be displayed without deformation before and after rotation. In addition, rotation and/or enlargement or reduction processing of the background picture can be achieved at high speed without burdening the CPU, and the original background picture is not deformed.

BRIEF DESCRIPTION OF THE DRAWINGS

The foregoing and other objects, features, aspects and advantages of the present invention will become more apparent from the following detailed description of an exemplary embodiment of the present invention when taken in conjunction with the accompanying drawings, in which:

FIG. 6 is a schematic diagram showing exemplary bit configurations of addresses and data in a background picture character area and a background picture screen area in the VRAM shown in FIG. 1;

FIG. 7 is a graphical diagram helpful in explaining the rotation processing and enlargement or reduction processing of a background picture;

FIGS. 9 and 10, 10A and 10B are timing charts showing an exemplary operation of the background picture address control circuit shown in FIGS. 8A–8B;

FIGS. 12 to 16 are schematic diagrams respectively showing examples of the display of a background picture in a case where the original background picture is enlarged, rotated and reduced or processed in these combinations; and FIG. 17 is a block diagram showing an exemplary prior art television gaming apparatus.

DETAILED DESCRIPTION OF A PRESENTLY PREFERRED EXEMPLARY EMBODIMENT

Although in the following described exemplary embodiment, a television gaming machine is described, it should be noted that the present invention is also applicable to various video processing apparatus such as a personal computer or the like having as its object processing other than a game which is connected to a raster scan type CRT display.

Figure 1:
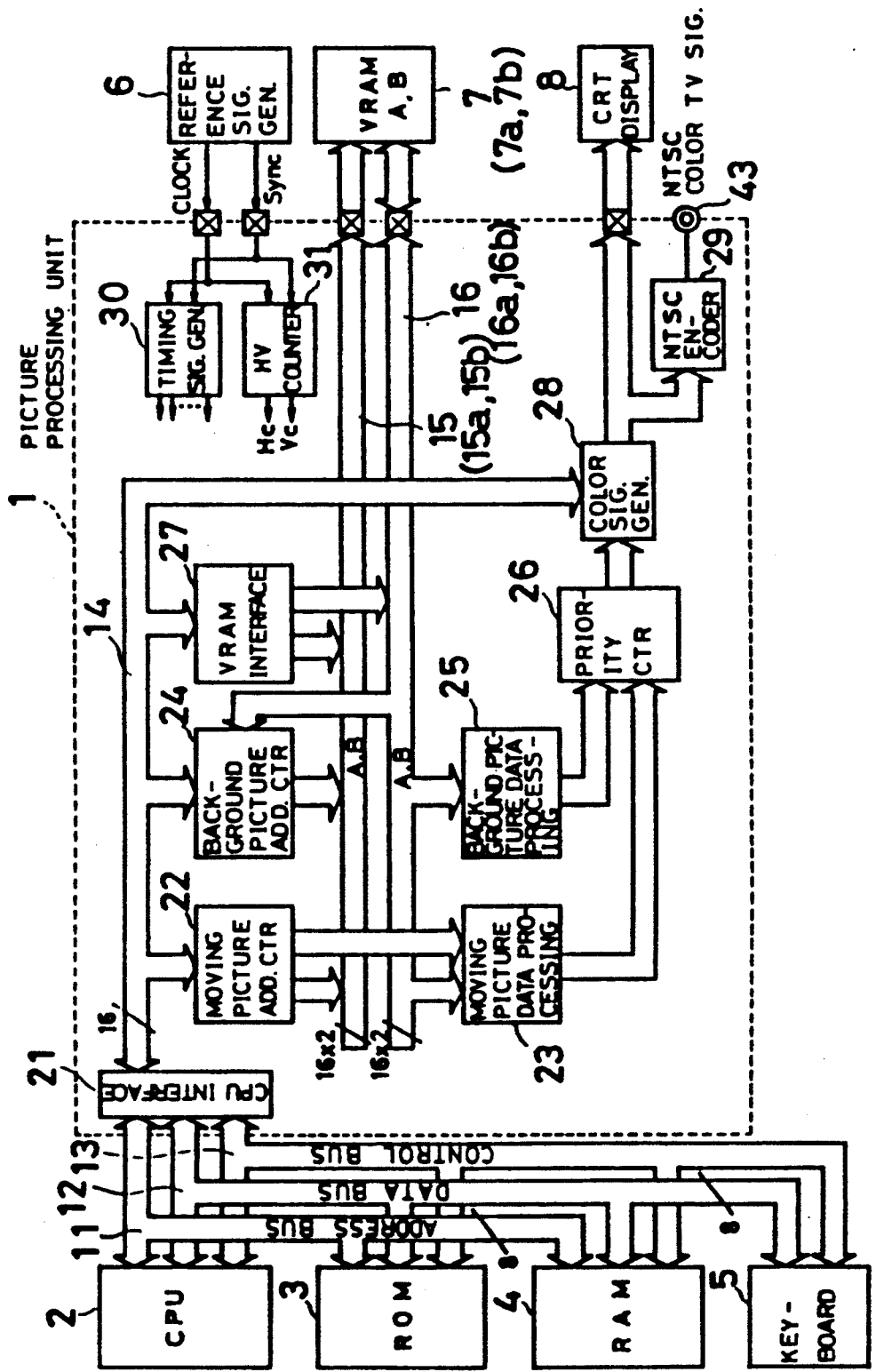
FIG. 1 is a block diagram of an exemplary presently preferred television gaming apparatus according to one embodiment provided by the present invention.

FIG. 1 is a schematic block diagram of an exemplary television gaming apparatus 100 according to a presently preferred exemplary embodiment provided by the present invention.

This embodiment may generate video signals for display by a conventional raster scan type CRT display 8 such as an RGB monitor or a standard television receiving set. One screen or frame of such a display 8 is typically divided into 256×256 dots (pixels). However, since an image cannot be accurately displayed in portions of several lines on upper and lower sides due to a curved surface of the cathode-ray tube, 224 dots (excluding the lines from the number of dots in the vertical direction) are preferably actually utilized. Consequently, if one character—which is the minimum unit of a background picture (and/or a moving picture)—is composed of a 8×8 dots, 32×28=896 characters can be simultaneously displayed on one screen of the display 8.

The presently preferred embodiment television gaming apparatus independently controls background picture generation and moving picture generation. A background picture (or a still picture) forms a background which cannot be individually changed by an operation of a player. A moving picture can be moved by an operation of the player or by the control of a CPU 2. A picture processing unit 1 outputs a video signal for display by CRT display 8. The picture processing unit 1 composes (and generates video signals specifying) the background picture and the moving picture. The picture processing unit 1 includes a background picture address control circuit 24 which evaluates a read address of a VRAM 7 storing image data of the background picture by operation processing at the time of rotation and/or enlargement or reduction processing of the background picture; and changes the read address without changing the image data to perform rotation and/or enlargement or reduction processing.

Television gaming machine 100 includes a read-only memory (ROM) 3, a RAM 4 and a keyboard (user controls) 5 connected (through an address bus 11, a data bus 12 and a control bus 13) to a CPU 2 for carrying out a variety of television gaming machine control operations.

The ROM 3 in the preferred embodiment is used for storing program data for controlling the television gaming machine, data required to execute the program, and character data. The ROM 3 is contained in, for example, a cartridge 3a attachable to and detachable from the television gaming machine 100. This program data includes data for determining what type of moving character and/or background character is to be displayed, at what time the character is to be displayed, and in which coordinate position on a screen the character is to be displayed, as well as data for rotation, enlargement and reduction processing, etc. For each moving character to be displayed moving picture attribute data is associated with each character. Such moving picture attribute data includes: horizontal position data (Hc: 8 bits) for designating the character horizontal position, vertical position data (Vc: 8 bits) for designating the character vertical position, a character code (9 bits) for designating the type of character, a pallet code (3 bits) for designating a color pallet, a flip code (2 bits) for specifying display of a character reversed in the vertical and/or horizontal directions, a size code (1 bit) for designating the dot size of a character, and priority data (2 bits) for designating priority over a background picture. For each background character to be displayed the following data is associated with each character: a character code (8 bits) for designating the type of character, color data (8 bits) for each of pixels constituting a character, etc. Many background characters are displayed in combination to constitute a background picture (still picture), and a plurality of moving characters are typically displayed to constitute a moving picture. The background picture and the moving picture are composed and displayed on the same screen. A background character code corresponding to each address of the background picture is designated as data for displaying one background picture so as to determine which background character is to be written, in which address out of addresses in the vertical and horizontal directions in a VRAM area (as described later) the background character is to be written and consequently, whether or not the background character is to be displayed in a desired position (coordinates) on a screen corresponding to the address.

The RAM 4 is used as a working area by the above described CPU 2. The keyboard 4 is used for player input for controlling moving characters.

A CPU interface circuit 21 included in the picture processing unit 1 is connected to the CPU 2 through the address bus 11, the data bus 12 and the control bus 13. A reference signal generator 6, a VRAM 7 including two RAMS (7a, 7b), and a CRT display 8 such as an RGB monitor or a standard television receiving set are connected to the picture processing unit 1.

The picture processing unit 1, under the control of CPU 2, is used for transferring image data of moving picture character symbols and background picture character symbols to the VRAM 7 during a vertical blanking period or at a predetermined transfer time. The picture processing unit 1 is also used for reading the image data of the moving picture and/or the background picture stored in the VRAM 7. Such reading may be without any modification, or by outputting image data obtained by performing rotation, enlargement and reduction processing. PPU 1 converts the image data into an RGB signal and/or an NTSC color signal and outputs the same to display 8.

Picture processing unit 1 includes the CPU interface 21, a moving picture address control circuit 22, a background picture address control circuit 24, a VRAM interface 27 and a color signal generating circuit 28 which are connected to the CPU interface 21 through a data bus 14. An address bus 15 is connected to the moving picture address control circuit 22. The address bus 15 and a further data bus 16 are connected to the background picture address control circuit 24 and the VRAM interface 27. The address bus 15 and the data bus 16 respectively comprise dual address buses 15a and 15b and dual data buses 16a and 16b respectively corresponding to the two VRAMs 7a and 7b. A moving picture data processing circuit 23 and a background picture data processing circuit 25 are together connected to the data bus 16. Video processing relating to the moving picture character symbols is performed by the moving picture address control circuit 22 and the moving picture data processing circuit 23. Video processing concerning the background picture character symbols is performed by the background picture address control circuit 24 and the background picture data processing circuit 25. Outputs of the moving picture data processing circuit 23 and the background picture data processing circuit 25 are applied to a priority control circuit 26. An output of the priority control circuit 26 is converted into an RGB signal by the color signal generator 28 and can be directly applied to the RGB monitor 8a. The priority control circuit 26 above is also converted into an NTSC color television signal by an NTSC encoded 29 and output to the standard television receiving set 8b from an output terminal 43.

The picture processing unit 1 also includes a timing signal generator 30 and an HV counter 31. The timing signal generator 30 generates various timing signals on the basis of a 21.447 MHz clock signal, a vertical synchronization signal and a horizontal synchronization signal output from the reference signal generator 6. The HV counter 31 generates count data $H_c$ and $V_c$ for respectively designating the display positions in the horizontal and vertical directions within a display screen area 41 shown in FIG. 2 in response to the clock signal, the vertical synchronization signal and the horizontal synchronization signal from the reference signal generator 6.

Figure 2:
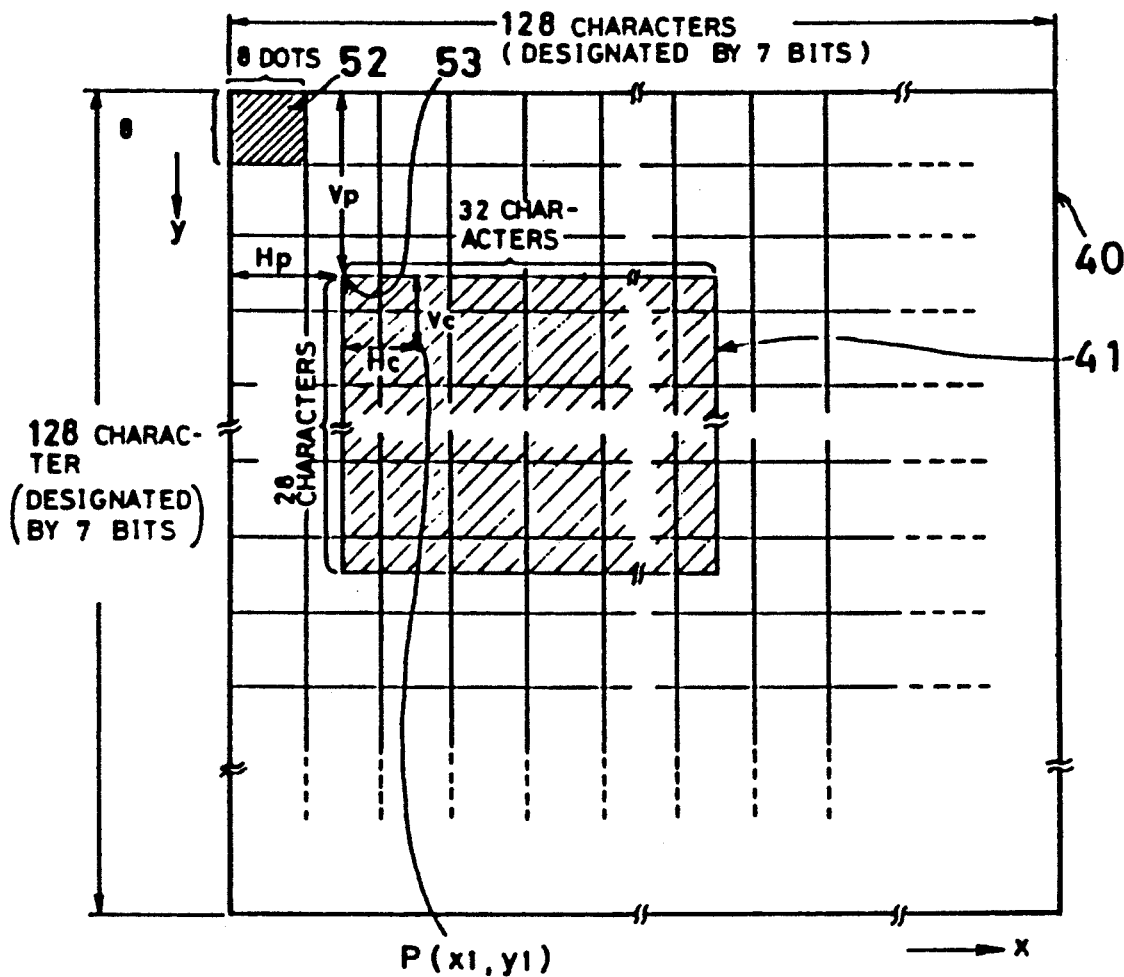
FIG. 2 illustrates an exemplary relation between a VRAM area and a display screen area of background picture data stored in a VRAM 7 shown in FIG. 1.

FIG. 2 is a diagram showing the relation between a display screen area of the CRT display 8 and a background picture storage area of the VRAM 7. A display screen area 41 of the CRT display 8 may be constituted by, for example, a rectangle comprising 32 characters in the horizontal direction (breadth; x) and 28 characters in the vertical direction (length; y). If a background picture storage area (referred to as "VRAM area" hereinafter) 40 has no image data of a background picture in a portion which is not visible on a screen when the screen is reduced and displayed, a portion other than the background picture which is actually visible is displayed in black so that a screen having no background appears. Furthermore, in a case where a background picture of the entire screen is scrolled up and down and displayed, if image data of a background picture must be rewritten in real time, smooth scrolling cannot be achieved. Accordingly, the VRAM area 40 is provided having an area several times the display screen area 41 in the vertical and horizontal directions.

Figure 3:
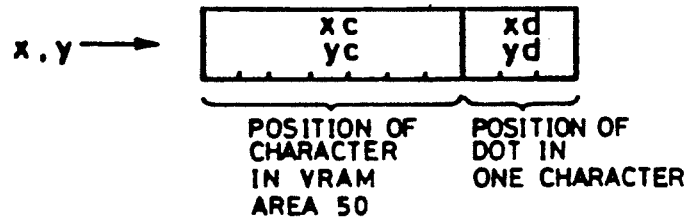
FIG. 3 is a schematic diagram showing an exemplary bit configuration of coordinates x and y indicating a position in the VRAM area shown in FIG. 2.

In the embodiment shown, the VRAM area 40 has a storage area comprising 128 characters in both the x and y directions (128×128=16384) such that the horizontal position and the vertical position can be respectively designated by 7-bit address data. A background character code to be displayed is written in an address designated by respective coordinate data in the x and y directions. Herein, the origin of the VRAM area 40 is set in a left upper end of FIG. 2 and is represented by x=0 and y=0, and the display position of a certain dot on the VRAM area 40 is represented by P(x, y). Further, in order to indicate a position 53 in a left upper end of the display screen area 41, the distances in the x and y directions from the origin (referred to as offset hereinafter) are represented by $H_p$ and $V_p$. Respective address data for designating the x and y coordinates are represented by xc and yc (7 bits each) indicating the position of a character in the VRAM area 40, and xd and yd (3 bits each) indicating the position of a dot in one character 52, as shown in FIG. 3.

Figure 4:
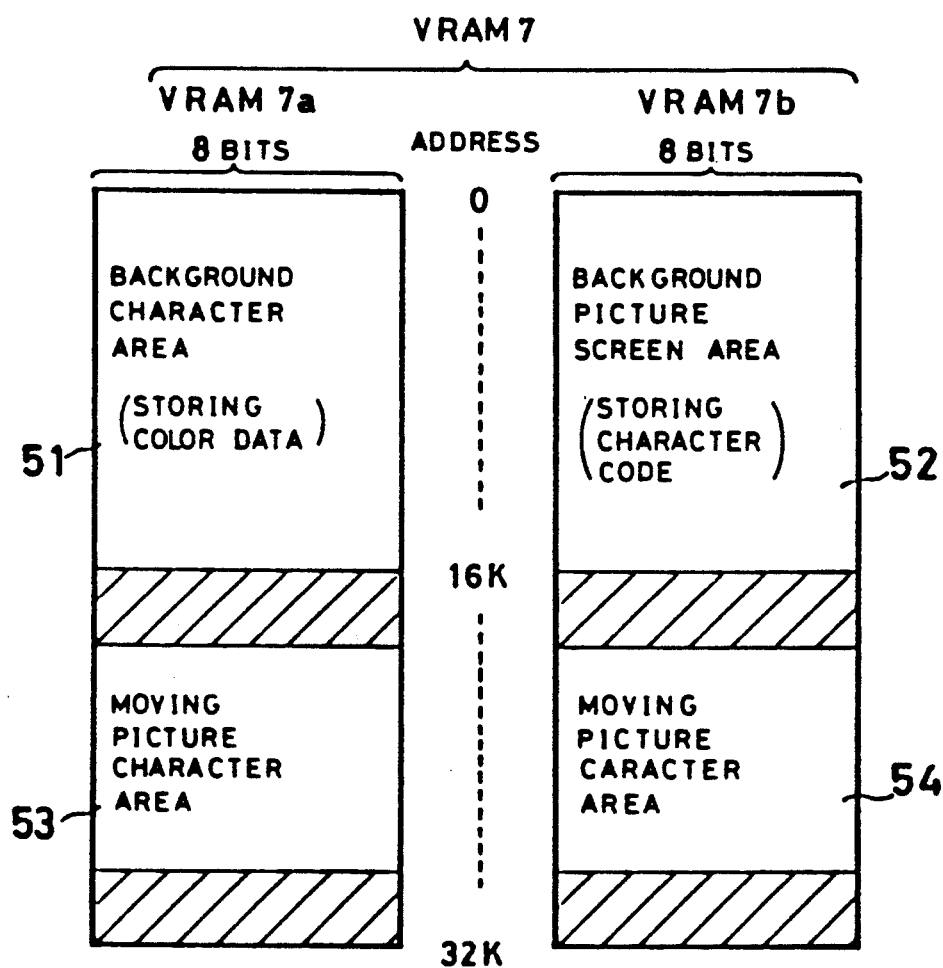
FIG. 4 is an exemplary memory map diagram of the VRAM shown in FIG. 1.

The VRAM 7 in the preferred embodiment comprises two VRAMs 7a and 7b respectively having the same storage capacity, as shown in FIG. 4. Each of the VRAMs 7a and 7b has addresses 0 to 32K. 8-bits of data can be stored at each of the addresses.

The VRAMs 7a and 7b are respectively divided into four 16K areas 51 to 54. The areas 51 and 52 having addresses 0 to 16K are used for storing data associated with a background picture, and the areas 53 and 54 (having addresses (16K+1) to 32K) are used for storing data associated with a moving picture. A lot of moving character data can be displayed in a period during which the same background picture is stored in the VRAM area 40.

Figure 5:
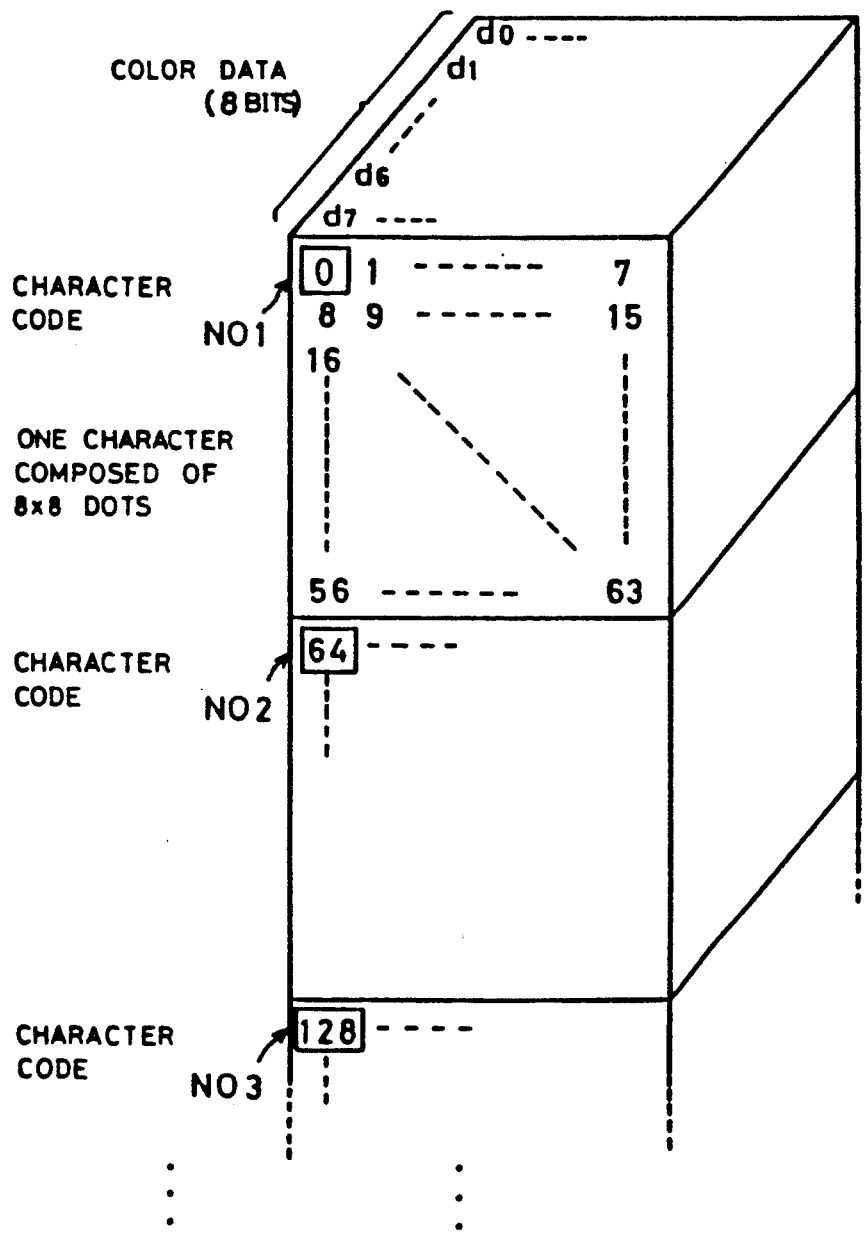
FIG. 5 is a schematic diagram showing exemplary storing conditions of color data of a background picture stored in the VRAM shown in FIG. 1.
Figure 8:
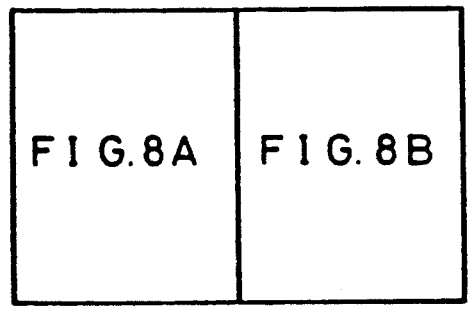
FIGS. 8, 8A and 8B are a detailed circuit diagram showing an exemplary background picture address control circuit 2 as shown in FIG. 1.

The area 51 in the VRAM 7a is used as a character area for storing color data for a maximum of 256 background characters. As shown in FIG. 5, one character has bits corresponding to 8×8 (length×breadth) dots and includes 8-bit color data for each dot. Accordingly, one character requires a storage capacity of 512 bits (64 bytes). A character code is determined for each character. The area 52 in the VRAM 7b has bytes corresponding to 128×128 (length×breadth) cells of the VRAM area 40 shown in FIG. 2 and is used as a screen area for storing character codes for the background picture in addresses designated by coordinates in the vertical and horizontal directions. An example of the formats of data written in the areas 51 and 52 is shown in FIG. 6.

Referring to FIGS. 1 to 6, the operation of the structure shown in FIG. 1 will now be described. Under the control of CPU 2, the CPU interface 21 transfers, to the VRAM interface 27, data associated with a background character and a moving character by direct memory access during the vertical blanking period (or by a predetermined transfer instruction which forces transfer at other times). At the same time, CPU interface 21 generates latch signals LA1 to LA4, LA11, LA12, LA14 and LA15 (to be explained in conjunction with FIGS. 8A-8B) for transferring control data for rotation, enlargement and reduction to the background picture address control circuit 24. The data for the background character and the moving character are written in advance in the VRAM 7 by the VRAM interface 27.

The moving picture address control circuit 22 comprises a moving picture attribute memory, an in-range detecting circuit and a moving picture address data generating circuit. The details of the motion picture attribute memory, in-range detecting circuit and moving picture address generating circuit are known and may, for example, be as shown and described in Japanese Patent Laid-Open Gazette No. 118184/1984, which corresponds to applicants' assignees' U.S. Pat. No. 4,824,106, which patent is incorporated herein by reference. Attribute data for 128 moving characters are transferred to the moving picture attribute memory from the CPU 2 through the CPU interface 21 and the data bus 14 and stored therein during a certain vertical blanking period. The in-range detecting circuit retrieves data to be displayed in the next horizontal scanning from the moving picture attribute memory for each scanning line. The moving picture address data generating circuit generates an address of the VRAM 7 indicating a reversed position in the display screen area 41 and outputs the same through the address bus 15 when V-flip data of the in-range detected attribute data is at the "H" level. On the other hand, it outputs an address of the VRAM 7 corresponding to the display screen area 41 of character data to the VRAM 7 through the address bus 15 without any modification when the V-flip data is at the "L" level.

The VRAM 7 is responsive to the address so as to apply, to the moving picture data processing circuit 23 through the data bus 16, the color data (4 bits per dot) of moving pictures stored in the moving picture character areas 53 and 54 which correspond to addresses output from the moving picture address data generating circuit in the moving picture address control circuit 22. Furthermore, the moving picture address data generating circuit directly applies to the moving picture data processing circuit 23 the H-flip data (1 bit), the color pallet data (3 bits) and the priority data (2 bits) out of the attribute data of the in-range detected moving characters.

Consequently, data of 10 bits per dot comprising the color data read from the VRAM 7, the H-flip data, the color pallet data and the priority data directly applied from the moving picture address control circuit 22 is sequentially input to the moving picture data processing circuit 23 with respect to 256 dots of one scanning line.

The moving picture data processing circuit 23 temporarily stores data of the next scanning line which is input during the horizontal blanking period and then, temporarily stores data of 9 bits per dot (excluding the H-flip data included in the data) in the order reverse to the input order when the H-flip data is at the "H" level to perform H-flip processing. On the other hand, this circuit 23 temporarily stores the 9-bit data in the input order when the H-flip data is at the "L" level. The temporarily stored moving picture data of one scanning line is output to the priority control circuit 26 in synchronization with horizontal scanning on the basis of the count data $H_c$ output from the HV counter 31.

During background picture normal processing, the background picture address control circuit 24 calculates a read address (16 bits) of a character code previously stored in the screen area 52 in the VRAM 7b corresponding to a dot of the background picture. This read address is calculated on the basis of the offset data $H_p$ and $V_p$ on the screen; the control data (including the H-flip data HF and the V-flip data VF) which are applied from the CPU 2; and the count data $H_c$ and $V_c$ applied from the HV counter 31. The address control circuit 24 then applies the address to the VRAM 7b through the address bus 15b. In addition, at the time of rotation processing and enlargement or reduction processing of a background picture, the background picture address control circuit 24 calculates a read address of a character code corresponding to a dot of the background picture at the time of rotation and enlargement or reduction on the basis of: the offset data $H_p$ and $V_p$ on the screen; the H-flip data HF; the V-flip data VF; and parameter data (including processing constants A, B, C and D at the time of rotation and enlargement or reduction which are applied from the CPU 2); and the count data $H_c$ and $V_c$ applied from the HV counter 31. The address control circuit 24 then applies the address to the VRAM 7b. The principle of the operation processing for rotation, enlargement and reduction will be described below with reference to FIG. 7.

In addition, the background picture address control circuit 24 calculates a character code read address corresponding to one dot of a background picture after performing scrolling processing of the screen on the basis of the offset data $H_p$ and $V_p$ on the screen applied from the CPU 2. At the same time, the background picture address control circuit 24 calculates a character code read address corresponding to one dot of the background picture after performing H-flip processing (when the H-flip data HF is at the "H" level), while calculating a read address of a character name corresponding to one dot of the background picture after performing V-flip processing (when the V-flip data VF is at the "H" level). The most significant two bits of the 16-bit read address data calculated by the background picture address control circuit 24 are "00" and the last significant 14 bits thereof are position data xc and yc (7 bits each) of a character corresponding to a display position of the background picture, shown in FIG. 6.

The VRAM 7b applies a character code stored in the address applied from the background picture address control circuit 24 to the background picture address control circuit 24 through the data bus 15b. Responsively, the background picture address control circuit 24 applies to the VRAM 7a through the address bus 15a an address comprising the most significant two bits "00", a 8-bit character code and the position data yd (3 bits) and xd (3 bits) of a dot corresponding to a display position of the background picture. The VRAM 7a reads the 8-bit color data stored in the address applied from the background picture address control circuit 24 and applies the same to the background picture data processing circuit 25 through the data bus 16a. Correspondingly, the background picture data processing circuit 25 latches the color data of 8 bits per dot as input and then, applies the 8-bit color data to the priority control circuit 26 on the basis of the count data $H_c$ output from the HV counter 31.

The priority control circuit 26 determines the priority between the 7-bit moving picture data input from the moving picture data processing circuit 23 and the 8-bit background picture data input from the background picture data processing circuit 25 on the basis of priority data, and outputs higher-priority data out of the moving picture data and the background picture data to the color signal generator 28. For example, the priority control circuit 26 outputs background picture data comprising the most significant three bits "000" and 8-bit color data to the color signal generator 28 when the priority data is "00", while outputting moving picture data of a total of 7 bits (comprising 3-bit color pallet data and 4-bit color data) to the color signal generator 28 when the priority data is "01".

The color signal generator 28 includes a color pallet table composed of a RAM having 8-bit addresses. The color generator RAM stores color signal data applied from the CPU 2 in the color pallet table during the vertical blanking period. During the horizontal scanning period, the color signal generator 28 reads the color signal data stored in a corresponding address of the color pallet table on the basis of the 8-bit moving picture data or background picture data input from the priority control circuit 26 and then, converts the color signal data into an RGB signal of 5 bits for each color. The color signal generator 28 directly outputs the RGB signal to the RGB monitor 8a in synchronization with the count data $H_c$ and $V_c$ applied from the HV counter 31 and at the same time, outputs the same to the NTSC encoder 29. The NTSC encoder 29 carries out digital-to-analog conversion of the RGB signal for each color and then, converts the RGB signal into the NTSC color television signal and outputs the same to the standard television receiving set 8b from the output terminal 9.

FIG. 7 is a diagram for explaining the principle of rotation processing and the enlargement or reduction processing of a background picture performed by the background picture address control circuit 24. In FIG. 7, it is assumed that x is a coordinate for each dot in the horizontal direction on the screen of the CRT display 8 and y is a coordinate for each dot in the vertical direction. Note that for purposes of illustration, the y direction is reverse to that shown in FIG. 2 (i.e., increasing y is up toward the top of the page in FIG. 7).

Let $P(X_1, Y_1)$ be coordinates of the original background picture before the background picture address control circuit 24 performs rotation, enlargement or reduction processing, and let $Q'(X_2', Y_2')$ be coordinates of the background picture in a case where the original background picture is rotated around coordinates $R(X_0, Y_0)$ through an angle $\gamma$. Furthermore, let $Q(X_2, Y_2)$ be coordinates of the background picture in a case where the background picture having the coordinates $Q'(X_2', Y_2')$ is enlarged or reduced at scaling magnification $\alpha$ in the x direction and at scaling magnification $\beta$ in the y direction using as a basis the coordinates $R(X_0, Y_0)$. In this case, the relationship among the coordinates P, R and Q is expressed by the following equation (1):

$$\begin{bmatrix} X_2 \\ Y_2 \end{bmatrix} = \begin{bmatrix} A & B \\ C & D \end{bmatrix} \begin{bmatrix} X_1 - X_0 \\ Y_1 - Y_0 \end{bmatrix} + \begin{bmatrix} X_0 \\ Y_0 \end{bmatrix} \quad (1)$$

Herein, constants (parameters) A, B, C and D are expressed by the following equations (2) to (5):

$$A = 1/\alpha \cdot \cos\gamma \quad (2)$$

$$B = 1/\alpha \cdot \sin\gamma \quad (3)$$

$$C = -1/\beta \cdot \sin\gamma \quad (4)$$

$$D = 1/\beta \cdot \cos\gamma \quad (5)$$

When only rotation processing (but no scaling) of a background picture is performed, $\alpha = \beta = 1$. Consequently, the constants A, B, C and D in this case are expressed by the following equations (6) to (9):

$$A = \cos\gamma \quad (6)$$

$$B = \sin\gamma \quad (7)$$

$$C = -\sin\gamma \quad (8)$$

$$D = \cos\gamma \quad (9)$$

Furthermore, when only enlargement or reduction (scaling) processing but no rotation is performed, $\gamma = 0$. Accordingly, the constants A, B, C and D are expressed by the following equation (10) to (12):

$$A = 1/\alpha \quad (10)$$

$$B = C = 0 \quad (11)$$

$$D = 1/\beta \quad (12)$$

In the equation (1), the coordinates P $(X_1, Y_1)$ of the original background picture are expressed by the following equations (13) and (14) if the above described offset data $H_p$ and $V_p$ in the VRAM area 40 shown in FIG. 2 and the count data $H_c$ and $V_c$ output from the VH counter 31 are used:

$$X_1 = H_p + H_c \quad (13)$$

$$Y_1 = V_p + V_c \quad (14)$$

Consequently, if $x_2$ and $y_2$ are developed by substituting the above described equations (13) and (14) in the equation (1), $x_2$ and $y_2$ are expressed by the following equations (15) and (16):

$$X_2 = [X_0 + (H_p - X_0) \cdot A + (V_p - Y_0) \cdot B + V_c \cdot B] + H_c \cdot A \quad (15)$$

$$Y_2 = [Y_0 + (V_p - Y_0) \cdot D + (H_p - X_0) \cdot C + V_c \cdot D] + H_c \cdot C \quad (16)$$

In the above described equations (15) and (16), terms $H_c \cdot A$ and $H_c \cdot C$ are terms which are changed for each dot on the screen, and terms other than $H_c \cdot A$ and $H_c \cdot C$ (that is, terms in parenthesis) are terms which are not changed during one scanning line. Consequently, the terms $H_c \cdot A$ and $H_c \cdot C$ must be calculated for each dot in the horizontal scanning period. On the other hand, the terms other than $H_c \cdot A$ and $H_c \cdot C$ need not be calculated during the horizontal scanning period. It is rather difficult to calculate the terms during the very short time available for each dot of horizontal scanning. Accordingly, the terms are collectively calculated before scanning of one line is started, (i.e., they are preliminarily processed). Therefore, in order to calculate terms to be preliminarily processed with the equations (15) and (16) using simple circuits, the equations are replaced with the following equations (17) to (24) and operated on in the following step-by-step manner:

$$E_1 = H_p - X_0 \quad (17)$$

$$E_2 = V_p - Y_0 \quad (18)$$

$$E_3 = X_0 + E_1 \cdot A \quad (19)$$

$$E_4 = Y_0 + E_2 \cdot D \quad (20)$$

$$E_5 = E_3 - E_2 \cdot B \quad (21)$$

$$E_6 = E_4 - E_1 \cdot C \quad (22)$$

$$E_7 = E_5 - V_c \cdot B \quad (23)$$

$$E_8 = E_6 - V_c \cdot D \quad (24)$$

Figure 8A:
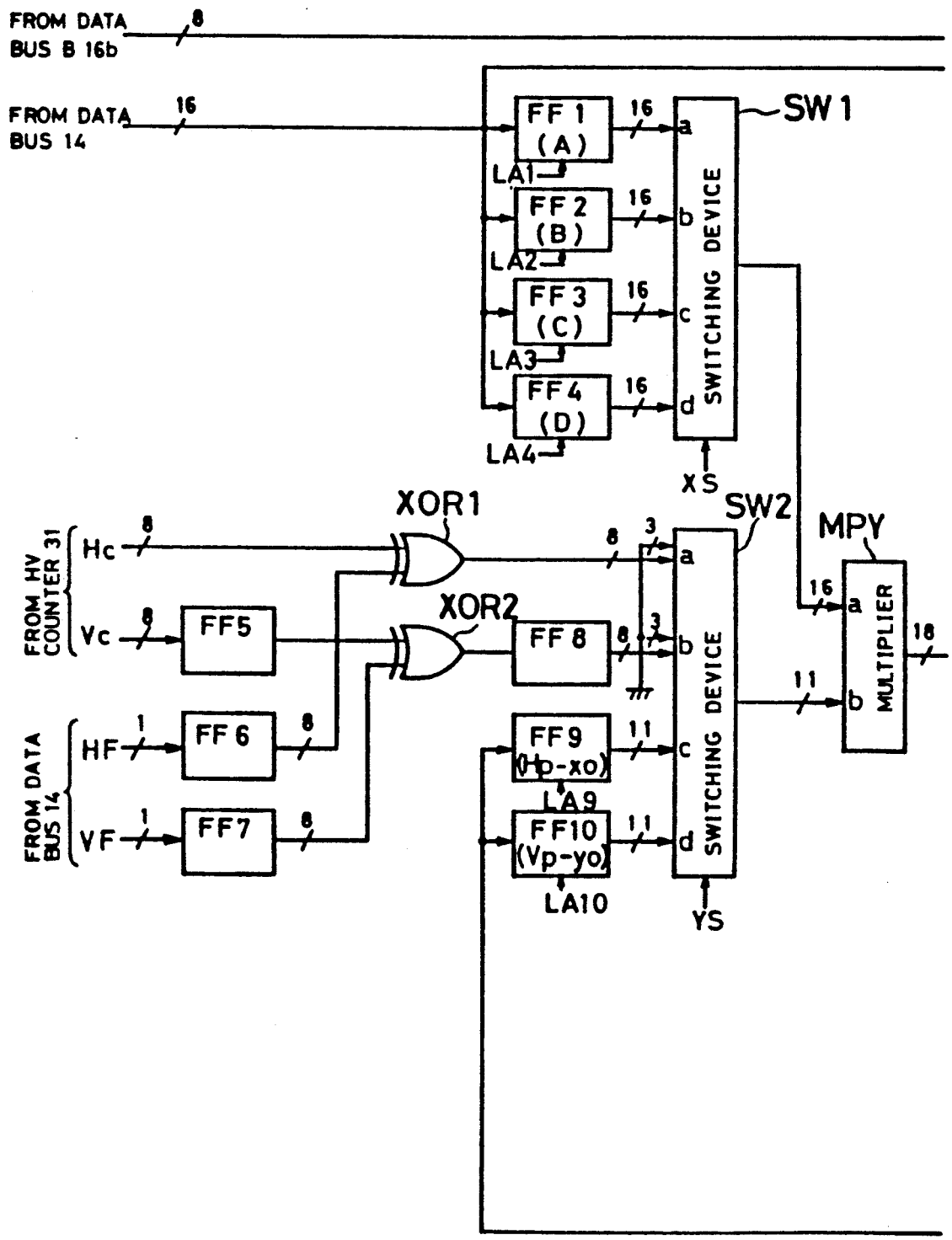
Figure 8B:
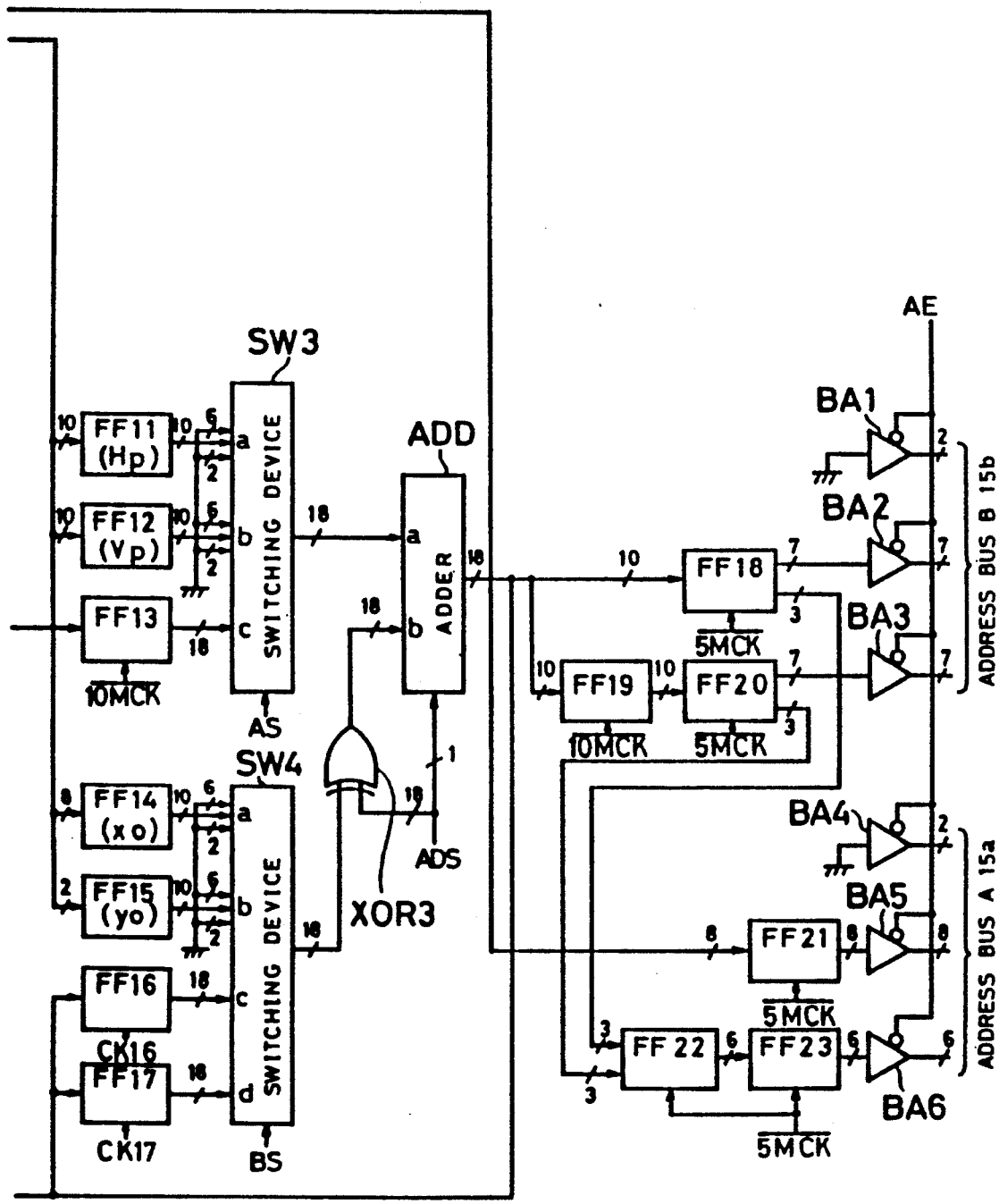

FIGS. 8A and 8B are a detailed circuit diagram showing the background picture address control circuit 24. This background picture address control circuit 24 evaluates coordinates $(X_2, Y_2)$ at the time of rotation and enlargement or reduction of a background picture by a matrix operation using the above described equation (1) and then, outputs its coordinate data as a read address of the screen area 52 and a read address of the character area 51.

More specifically, the background picture address control circuit 24 includes registers FF1 to FF23 each composed of a plurality of delay-type (D-type) flip-flops. Each of the registers FF1 to FF23 latches data applied to its input terminal at a time when a latch signal is applied, and outputs the data to its input terminal. In addition, inverted clock signals obtained by inverting a clock "10MCK" of 10.739 MHz output from the timing signal generator 30 are respectively input to the registers FF13 to FF19. Inverted clock signals obtained by inverting a clock "5MCK" of 5.369 MHz output from the timing signal generator 30 are respectively input to the registers FF18, FF20, FF21, FF22 and FF23.

16-bit constant data A, B, C and D applied from the CPU 2 through the CPU interface circuit 21 and the data bus 14 are respectively latched in the registers FF1 to FF4 at times when corresponding latch signals LA1 to LA4 are applied by CPU 2. Their latched data are applied to input terminals a, b, c and d of a switching device SW1. The switching device SW1 selects any one of the latched data input to the input terminals a, b, c and d and outputs the same to input terminals a of a multiplier MPY on the basis of an XS signal output from timing signal generator 30.

Count data $H_c$ output from the HV counter 31 is input to an exclusive OR circuit XOR1. The register FF5 latches the 8-bit count data $V_c$ output from the HV counter 31 and outputs the same to an exclusive OR circuit XOR2. The registers FF6 and FF7 respectively latch the 1-bit H-flip data HF and the 1-bit V-flip data VF applied from the CPU 2 on a leading edge of a machine clock of the CPU 2 and respectively output, to the exclusive OR circuits XOR1 and XOR2, 8 bits of data having the same level as the H-flip data HF; and 8 bits of data having the same level as V-flip data VF.

The exclusive OR circuits XOR1 and XOR2 respectively include eight exclusive OR gates each having first and second inputs. Respective bits of the count data $H_c$ are applied as respective first inputs of each of the eight exclusive OR gates included in the exclusive OR circuit XOR1, and corresponding bits of the data in the register FF6 are applied as the respective second inputs thereof. Respective bits of the count data $V_c$ are applied as respective first inputs of the eight exclusive OR gates included in the exclusive OR circuit XOR2, and corresponding bits of the data in the register FF7 are applied as the respective second inputs thereof. The respective eight exclusive OR gates included in the exclusive OR circuits XOR1 and XOR2 perform an exclusive OR operation on their respective inputs, and apply 8-bit data which are the results of the operation to input terminals a and input terminals b of the switching device SW2 (directly or through the register FF8). Input terminals a and b of switching device SW2 are 11 bits wide, and the most significant three bits of each of the input terminals a and b are connected to ground ("000"). In addition, the switching device SW2 includes input terminals c and d, and 11-bit data from the registers FF9 and FF10 are respectively input to the input terminals c and d.

The register FF9 latches data of the least significant 11 bits (E1) of 18-bit data applied from an adder ADD on a leading edge of a latch signal LA9 output from the timing signal generator 30 and applies its latching data to the input terminals c of the switching device SW2. The register FF10 latches data of the least significant 11 bits (E2) of the 18-bit data applied from the adder ADD on the leading edge of a latch signal LA10 output from the timing signal generator 30 and applies its latched data to the input terminals d of the switching device SW2. The switching device SW2 selects any one of the data input to the input terminals a, b, c and d on the basis of a YS signal output from the timing signal generator 30, and applies the same to input terminals b of the multiplier MPY.

The multiplier MPY multiplies any one of the data A to D input to the input terminals a by any one of the data E1, E2 and $V_c$ input to the input terminals b to calculate the second term in any one of the equations (19) to (24) and applies data which are the results of the multiplication to input terminals c of a switching device SW3 through the register FF13.

The register FF11 latches offset data $H_p$ (10 bits) in the x direction applied from the CPU 2 on the leading edge of the machine clock and applies the same to input terminals a of the switching device SW3. In addition, the register FF12 latches offset data $V_p$ (10 bits) in the y direction applied from the CPU 2 on the leading edge of the machine clock and applies the same to input terminals b of the switching device SW3. The most significant six bits and the least significant two bits of each of the input terminals a and b of the switching device SW3 are connected to ground. The least significant two bits of the data input to each of the input terminals of the switching device SW3 correspond to data after the decimal point.

The switching device SW3 selects one of the data input to the input terminals a, b and c on the basis of an AS signal output from the timing signal generator 30 and applies the same to input terminals a of the adder ADD.

The register FF14 latches the position data $x_0$ in the x direction of the original background picture applied from the CPU 2 (the least significant eight bits of the data bus 14) on the leading edge of the machine clock and then, applies data of a total of 10 bits including the most significant two bits "00" and its latched data to input terminals a of a switching device SW4. In addition, the register FF15 latches the position data $Y_0$ in the y direction of the original background picture applied from the CPU 2 (the most significant two bits from the above described data $x_0$ of the data bus 14) on the leading edge of the machine clock and then, applies data of a total of 10 bits (including the most significant eight bits "00000000" and its latched data) to input terminals b of the switching device SW4. The most significant six bits and the least significant two bits of each of the input terminals a and b of the switching device SW4 are connected to ground. The least significant two bits of the data input to each of the input terminals of the switching device SW4 correspond to data after the decimal point.

The register FF16 latches 18-bit data output from the adder ADD on a leading edge of a clock CK16 output from the timing signal generator 30 and applies the same to input terminal c of the switching device SW4. In addition, the register FF17 latches 18-bit data output from the adder ADD on a leading edge of a clock CK17 output from the timing signal generator 30 and applies the same to input terminals d of the switching device SW4. The switching device SW4 applies 18-bit data out of the data input to the input terminals a, b, c and d to an exclusive XOR circuit XOR3 on the basis of a signal BS output from the timing signal generator 30. The exclusive OR circuit XOR3 includes 18 exclusive OR gates. Corresponding bits of the data in the switching device SW4 are applied as respective one inputs of the exclusive OR gates, and an ADS signal output from the timing signal generator 30 is applies as the respective other inputs thereof.

Furthermore, a certain bit of the ADS signal is input to a carry-in terminal of the adder ADD. When this bit of the ADS signal input to the carry-in terminal of the adder ADD is at the "H" level, the ADS signal input to the respective other input terminals of the exclusive OR gates in the exclusive OR circuit XOR3 is a signal in which all 18 bits are at the "H" level. On the other hand, if the bit of the ADS signal input to the carry-in terminal of the adder ADD is at the "L" level, the ADS signal input to the respective other input terminals of the exclusive OR gates in the exclusive OR circuit XOR3 is a signal in which all 18 bits are at the "L" level. The exclusive OR circuit XOR3 operates in the same manner as the exclusive OR circuits XOR1 and XOR2. That is, the exclusive OR circuit XOR3 performs an exclusive OR operation of data input to one input terminal and data input to a corresponding other input terminal with respect to each bit and applies the results of the operation to input terminals b of the adder ADD.

The adder ADD adds both the data input to the input terminals a and b and further adds one of the results of the addition only when the ADS signal at the "H" level is input to the carry-in terminal. Thereafter, out of the results of the addition, 18-bit data is stored in the registers FF16 and FF17, data of the least significant 11 bits is stored in the registers FF9 and FF10, 10-bit data is stored in the registers FF18 and FF19, and data of the least significant eight bits is stored in the register FF21.

Therefore, when the "H" signal is input to the carry-in terminal, an operation of subtracting the output data of the switching device SW4 from the output data of the switching device SW3 is performed by operations of the exclusive OR circuit XOR3 and the adder ADD. On the other hand, when the "L" signal is input to the carry-in terminal, a reverting operation by the exclusive OR circuit XOR3 and an operation of adding one by the adder ADD are not performed. Consequently, an operation of only adding the output data of the switching device SW3 to the output data of the switching device SW4 is performed. In this embodiment shown, the multiplier MPY and the adder ADD repeatedly perform a multiplication operation or an addition operation of two data (coordinate data, constant data or data of the results of an operation obtained immediately before) applied by switching of the switching devices SW1 to SW4 in a time shared manner to sequentially perform operations expressed by the equations (17) to (24) and finally perform operations expressed by the equations (15) and (16). Moreover, the rotation and/or the enlargement or reduction processing can be achieved using a common circuit by changing the constant data.

The register FF18 latches the 10-bit data as input and then, outputs data yc of the most significant seven bits as address data of the third to eighth bits from the most significant bit of the address bus 15b through a tri-state buffer amplifier (referred to as "buffer amplifier" hereinafter) BA2 and applies data yd of the least significant three bits to the register FF22. The register FF19 latches the 10-bit data as input and then, applies the same to the register FF20. The register FF20 latches the 10-bit data as input and then, outputs data xc of the most significant seven bits as address data of the least significant seven bits of the address bus 15b through a buffer amplifier BA3 and applies data xd of the least significant three bits to the register FF22.

The register FF21 latches the 8-bit character code input from the VRAM 7b through the data bus 16b and then, outputs the same as address data of the third to seventh bits from the most significant bit of the address bus 15b through a buffer amplifier BA5. The register FF22 latches the two 3-bit data yd and xd as input and then, outputs the data as address data of the least significant six bits of the address bus 15a through the register FF23 and a buffer amplifier BA6.

In addition, input terminals of two bits of the buffer amplifier BA1 are connected to ground, and output terminals (2 bits) of the buffer amplifier BA1 are connected to the most significant two bits of the address bus 15b. Input terminals of two bits of the buffer amplifier BA4 are connected to ground, and output terminals (2 bits) of the buffer amplifier BA4 are connected to the most significant two bits of the address bus 15.

Figure 10:
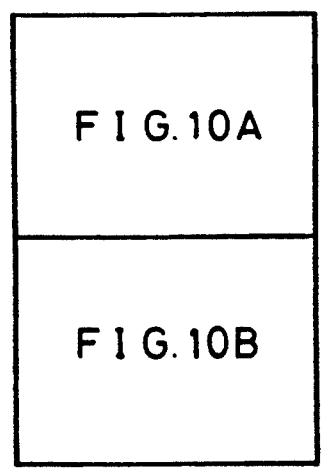
Figure 10A:
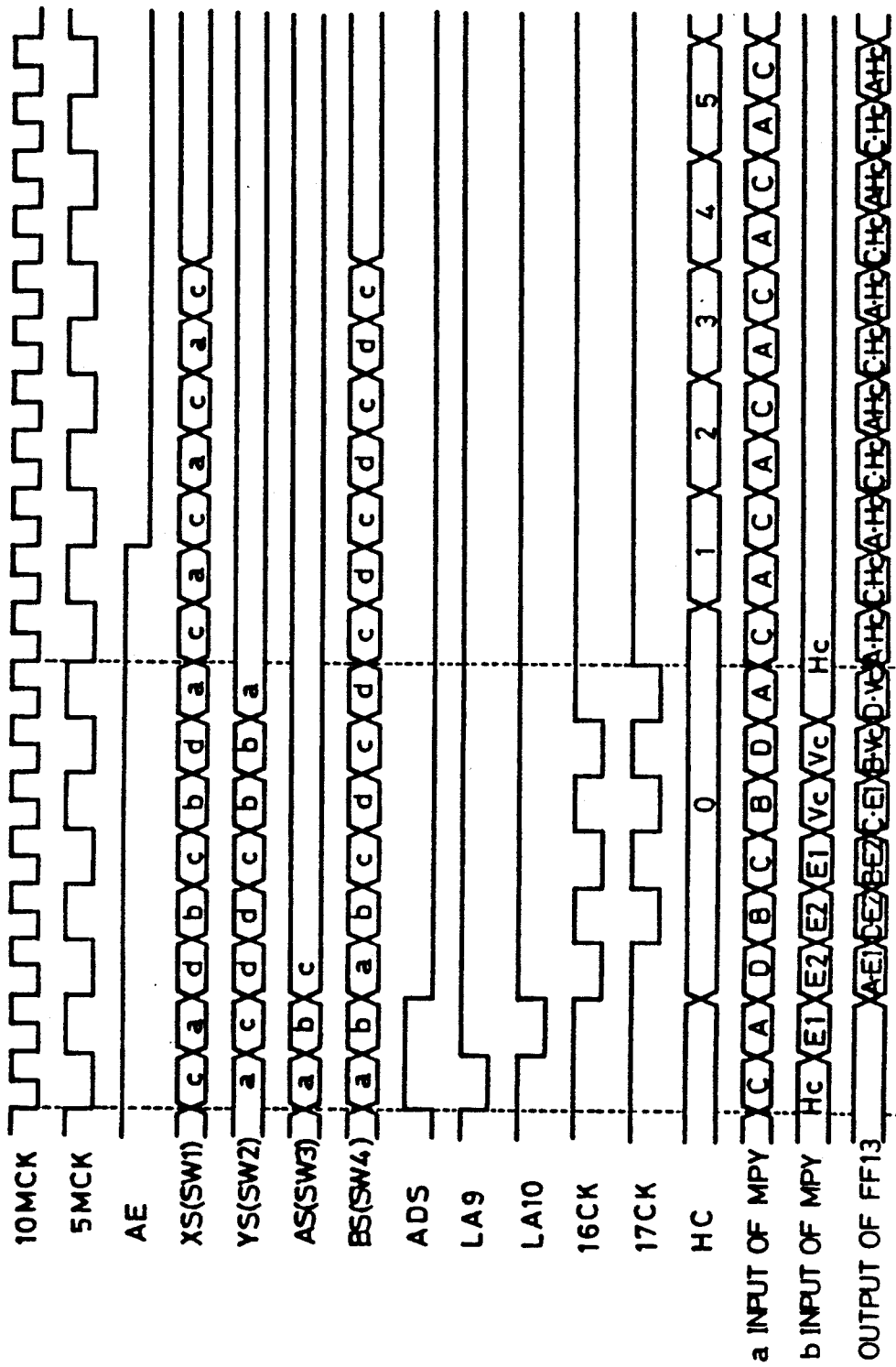
Figure 10B:
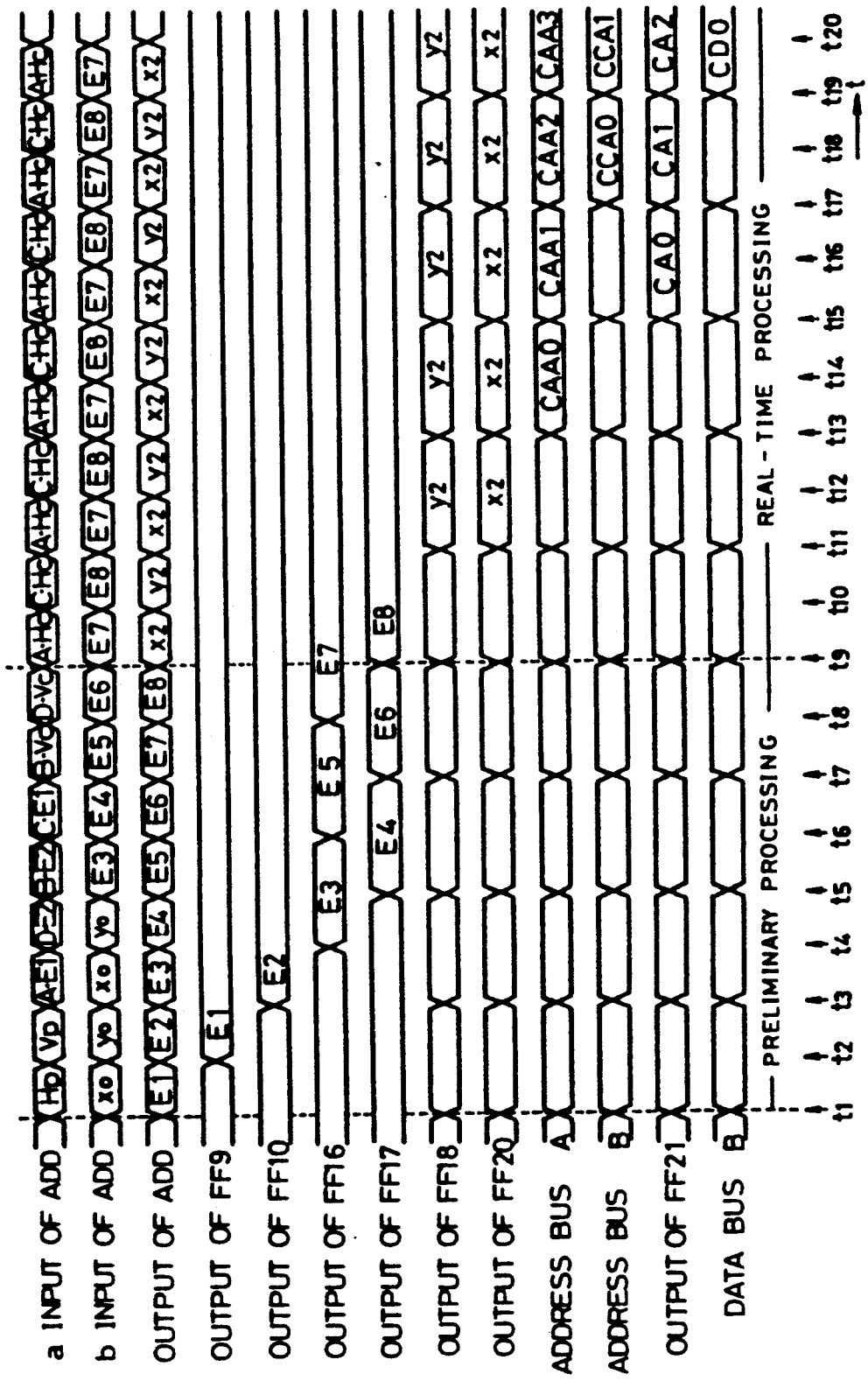

FIGS. 9 and 10A and 10B are timing charts for explaining an operation of the enlargement or reduction and/or the rotation processing of a background picture which characterizes this embodiment. In particular, FIG. 9 shows one horizontal scanning period and horizontal blanking period, and FIGS. 10A and 10B show the periods of preliminary processing and an example of a part of real-time processing in a case where an H count value is 9 to 17.5.

Referring now to FIGS. 1 to 10, the detailed operation of the enlargement or reduction and/or the rotation processing of a background picture. A description is made of an operation of the background picture address control circuit 24 for performing processing of one scanning line in a case where a background picture positioned in the display area 41 in the VRAM area 40 shown in FIG. 2 is rotated around the reference coordinates $R(X_0, Y_0)$ through an angle $\gamma$ and is enlarged or reduced at scaling magnification $\alpha$ in the x direction and scaling magnification $\beta$ in the y direction as described above with reference to FIG. 7.

The constants A, B, C and D are calculated in the CPU 2 using the above described equations (2) to (5) on the basis of $\alpha$, $\beta$ and $\gamma$ as described above. Data indicative of the previously calculated constants A, B, C and D are input to the flip-flops FF1 to FF4 from the CPU 2 through the CPU interface circuit 21 and the data bus 14 to be latched therein. In addition, the above described offset data $H_p$ and $V_p$ on the screen, the data $x_0$ and $Y_0$ representing the above described reference coordinates, and the H-flip data HF and the V-flip data VF with respect to the background picture are respectively output from the CPU 2 and input to the flip-flops FF11, FF12, FF14, FF15, FF6 and FF7 through the CPU interface circuit 21 and the data bus 14 to be latched therein.

Now, the data $H_c$ input from the HV counter 31 is reversed by the exclusive OR gate XOR1 and output to the input terminals a of the switching device SW2 when the H-flip data HF is at the "H" level. On the other hand, the data $H_c$ input from the HV counter 31 is output to the input terminals a of the switching device SW2 through the exclusive OR gate XOR1 without any modification when the H-flip data HF is at the "L" level. Further, the data $V_c$ input from the HV counter 31 and latched in the flip-flop FF5 during processing of one scanning line is reversed by the exclusive OR gate XOR2 and input to the flip-flop FF8 to be latched therein when the V-flip data VF is at the "H" level. On the other hand, the above data $V_c$ is input to the flip-flop FF8 through the exclusive OR gate XOR2 without any modification to be latched therein when the V-flip data VF is at the "L" level. H-flip and V-flip operations of a background picture are respectively performed by reversing operations of the above described exclusive OR gates XOR1 and XOR2. The data output from the above described exclusive OR gates XOR1 and XOR2 are respectively referred to as data $H_c$ and $V_c$ irrespective of whether or not they are reversed, for convenience of description.

Additionally, before rotation and enlargement or reduction processing the character name and the color data of the original background picture are stored in the background picture screen area 52 in the VRAM 7b and the background picture character area 51 in the VRAM 7a, respectively.

In FIG. 10, the times when a clock 10MCK of 10.739 MHz the symbol "/" in front of a symbol is used hereinafter in place of the conventional bar above the symbol which is used in FIG. 8B) output from the timing signal generator 30 rise are represented by t1, t2, t3, ..., t20, ... for convenience of description. In this case, preliminary processing takes place from the time t1 to the time t9 and includes calculating constants E1 to E8 during the vertical blanking period before the period an image signal, i.e., a video signal is output from the picture processing unit 1. Processing after the time t9 is real-time processing performed in synchronization with the generation and the display of an image signal which is a digital signal of RGB representative of a video signal. Such real-time processing includes evaluating coordinates Q $(X_2, Y_2)$ of the background picture at the time of the rotation and the enlargement or reduction on the basis of the constants calculated in the preliminary processing and the count data $H_c$ and $V_c$, outputting an address of the background picture screen area 52 in the VRAM 7b and then, outputting an address of the background picture character area 51 in the VRAM 7a on the basis of a character code read from the area 52.

As shown in FIG. 10A, during a time period t1 to the time t2, both the switching devices SW3 and SW4 are switched to their input terminal a. The data $H_p$ is input to the input terminals a of the adder ADD from the flip-flop FF11 through the switching device SW3. On the other hand, the data $x_0$ is input to the input terminals b of the adder ADD from the flip-flop FF14 through the switching device SW4 and the exclusive OR gate XOR3. At this time, the ADS signal is at the "H" level. Accordingly, the exclusive OR gate XOR3 and the adder ADD perform subtraction processing in the above described manner and thus, perform an operation of data $E1 = (H_p - X_0)$ and outputs the results of the operation. The data E1 is input to the flip-flop FF9 to be latched therein on the leading edge of the latch signal LA9 at the time t2.

During time period t2 to the time t3, the switching devices SW1 and SW2 are respectively switched to its input terminals a and its input terminals c. The data A is input to the input terminals a of the multiplier MPY from the flip-flop FF1 through the switching device SW1. On the other hand, the data E1 is input to the input terminals b of the multiplier MPY from the flip-flop FF9 through the switching device SW2. The multiplier MPY performs an operation of data A·E1 and outputs the results of the operation. The data A·E1 is input to the flip-flop FF13 to be latched therein on the leading edge of the clock/10MCK at the time t3.

Furthermore, during time period t2 to the time t3, both the switching devices SW3 and SW4 are switched to their input terminals b. The data $V_p$ is input to the input terminals a of the adder ADD from the flip-flop FF11 through the switching device SW3. On the other hand, the data $Y_0$ is input to the input terminals b of the adder ADD from the flip-flop FF15 through the switching device SW4 and the exclusive OR gate XOR3. At this time, the ADS signal is at the "H" level. Accordingly, the exclusive OR gate XOR3 and the adder ADD perform subtraction processing in the above described manner and thus, perform an operation of data $E2 = (V_p - Y_0)$ and output the results of the operation. The data E2 is input to the flip-flop FF10 to be latched therein on the leading edge of the latch signal LA10 at the time t3.

During the time period from t3 to the time t4, both the switching devices SW1 and SW2 are switched to their input terminals d. The data D is input to the input terminals a of the multiplier MPY from the flip-flop FF4 through the switching device SW1. On the other hand, the data E2 is input to the input terminals b of the multiplier MPY from the flip-flop FF10 through the switching device SW2. The multiplier MPY performs an operation of data D·E2 and outputs the results of the operation. The data D·E2 is input to the flip-flop FF13 to be latched therein on the leading edge of the clock /10MCK at the time t4.

Additionally, during the time period t3 to the time t4, the switching devices SW3 and SW4 are respectively switched to input terminal c and its input terminal a. The data A·E1 is input to the input terminals a of the adder ADD from the flip-flop FF13 through the switching device SW3. On the other hand, the data $x_0$ is input to the input terminals b of the adder ADD from the flip-flop FF14 through the switching device SW4 and the exclusive OR gate XOR3. At this time, the ADS signal is at the "L" level. Accordingly, the exclusive OR gate XOR3 and the adder ADD perform addition processing in the above described manner and thus, performs an operation of data $E3 = (A·E1) + x_0$ and output the results of the operation. The data E3 is input to the flip-flop FF16 to be latched therein on the leading edge of the clock 16CK at the time t4.

During the time period t4 to the time t5, the switching devices SW1 and SW2 are respectively switched to input terminals b and input terminals d. The data B is input to the input terminals a of the multiplier MPY from the flip-flop FF2 through the switching device SW1. On the other hand, the data E2 is input to the input terminals b of the multiplier MPY from the flip-flop FF10 through the switching device SW2. The multiplier MPY performs an operation of data B·E2 and outputs the results of the operation. The data B·E2 is input to the flip-flop FF13 to be latched therein on the leading edge of the clock /10MCK at the time t5.

Furthermore, during the time period t4 to the time t5, the switching devices SW3 and SW4 are respectively switched to input terminals c and input terminals b. The data D·E2 is input to the input terminals a of the adder ADD from the flip-flop FF13 through the switching device SW3. On the other hand, the data $y_0$ is input to the input terminals b of the adder ADD from the flip-flop FF15 through the switching device SW4 and the exclusive OR gate XOR3. At this time, the ADS signal is at the "L" level. Accordingly, the exclusive OR gate XOR3 and the adder ADD perform addition processing in the above described manner and thus, perform an operation of data $E4 = (D·E2) + y_0$ and output the results of the operation. The data E4 is input to the flip-flop FF17 to be latched therein on the leading edge of a clock 17CK at the time t5.

During the time period t5 to the time t6, both the switching devices SW1 and SW2 are switched to their input terminals c. The data C is input to the input terminals a of the multiplier MPY from the flip-flop FF3 through the switching device SW1. On the other hand, the data E1 is input to the input terminals b of the multiplier MPY from the flip-flop FF9 through the switching device SW2. The multiplier MPY performs an operation of data C·E1 and outputs the results of the operation. The data C·E1 is input to the flip-flop FF13 to be latched therein on the leading edge of the clock /10MCK at the time t6.

Furthermore, during the time period t5 to the time t6, both the switching devices SW3 and SW4 are switched to their input terminals c. The data B·E2 is input to the input terminals a of the adder ADD from the flip-flop 13 through the switching device SW3 On the other hand, the data E3 is input to the input terminals b of the adder ADD from the flip-flop FF16 through the switching device SW4 and the exclusive OR gate XOR3. At this time, the ADS signal is at the "L" level. Accordingly, the exclusive OR gate XOR3 and the adder ADD perform addition processing in the above described manner and thus, perform an operation of data $E5 = (B·E2) + E3$ and output the results of the operation. The data E5 is input to the flip-flop FF16 to be latched therein on the leading edge of the clock 16CK at the time t6.

During the time period t6 to the time t7, both the switching devices SW1 and SW2 are switched to their input terminals b. The data B is input to the input terminals a of the multiplier MPY from the flip-flop FF2 through the switching device SW1. On the other hand, the data $V_c$ is input to the input terminals b of the multiplier MPY from the flip-flop FF8 through the switching device SW2. The multiplier MPY performs an operation of data B·$V_c$ and outputs the results of the operation. The data B·$V_c$ is input to the flip-flop FF13 to be latched therein on the leading edge of the clock /10MCK at the time t7.

Furthermore, during the time period t6 to the time t7, the switching devices SW3 and SW4 are respectively switched to its input terminals c and its input terminals d. The data C·E1 is input to the input terminals a of the adder ADD from the flip-flop FF13 through the switching device SW3. On the other hand, the data E4 is input to the input terminals b of the adder ADD from the flip-flop FF17 through the switching devices SW4 and the exclusive OR gate XOR3. At this time, the ADS signal is at the "L" level. Accordingly, the exclusive OR gate XOR3 and the adder ADD perform addition processing in the above described manner and thus, perform an operation of data $E6=(C\cdot E1)+E4$ and output the results of the operation. The data E6 is input to the flip flop FF17 to be latched therein on the leading edge of the clock 17CK at the time t7.

During the time period t7 to the time t8, the switching device SW1 and SW2 are respectively switched to input terminals d and input terminals b. The data D is input to the input terminals a of the multiplier MPY from the flip-flop FF4 through the switching device SW1. On the other hand, the data $V_c$ is input to the input terminals b of the multiplier MPY from the flip-flop FF8 through the switching device SW2. The multiplier MPY performs an operation of data $D\cdot V_c$ and outputs the results of the operation. The data $D\cdot Y_c$ is input to the flip-flop FF13 to be latched therein on the leading edge of the clock/10MCK at the time t8.

Additionally, during the time period t7 to the time t8, both the switching devices SW3 and SW4 are switched to their input terminals c. The data $B\cdot V_c$ is input to the input terminals a of the adder ADD from the flip-flop 13 through the switching device SW3. On the other hand, the data E5 is input to the input terminals b of the adder ADD from the flip-flop FF16 through the switching device SW4 and the exclusive OR gate XOR3. At this time, the ADS signal is at the "L" level. Accordingly, the exclusive OR gate XOR3 and the adder ADD perform addition processing in the above described manner and thus, perform an operation of data $E7=(B\cdot V_c)+E5$ and output the results of the operation. The data E7 is input to the flip-flop FF16 to be latched therein on the leading edge of the clock 16CK at the time t8.

During the time period t8 to the time t9, both the switching devices SW1 and SW2 are switched to their input terminals a. The data A is input to the input terminals a of the multiplier MPY from the flip-flop FF1 through the switching device SW1. On the other hand, the data $H_c$ is input to the input terminals b of the multiplier MPY from the HV counter 31 through the exclusive OR gate XOR1 and the switching device SW2. The multiplier MPY performs an operation of data $A\cdot H_c$ and outputs the results of the operation. The data $A\cdot H_c$ is input to the flip-flop FF13 to be latched therein on the leading edge of the clock /10MCK at the time t9.

Furthermore, during the time period t8 to the time t9, the switching devices SW3 and SW4 are respectively switched to its input terminals c and its input terminals d. The data $D\cdot V_c$ is input to the input terminals a of the adder ADD from the flip-flop FF13 through the switching device SW3. On the other hand, the data E6 is input to the input terminals b of the adder ADD from the flip-flop FF17 through the switching device SW4 and the exclusive OR gate XOR3. At this time, the ADS signal is at the "L" level. Accordingly, the exclusive OR gate XOR3 and the adder ADD perform addition processing in the above described manner and thus, perform an operation of data $E8=(D\cdot V_c)+E6$ and output the results of the operation. The data E8 is input to the flip-flop FF17 to be latched therein on the leading edge of the clock 17CK at the time t9.

The preliminary preprocessing is terminated by the foregoing operations. Consequently, the data E7 is latched by the flip-flop FF16, and the data E8 is latched in the flip-flop FF17.

Furthermore, during the time period t9 to the time t10, the switching devices SW1 and SW2 are respectively switched to input terminals c and input terminals a. The data C is input to the input terminals a of the multiplier MPY from the flip-flop FF3 through the switching device SW1. On the other hand, the data $H_c$ is input to the input terminals b of the multiplier MPY from the HV counter 31 through the exclusive OR gate XOR1 and the switching device SW2. The multiplier MPY performs an operation of data $C\cdot H_c$ and outputs the results of the operation. The data $C\cdot H_c$ is input to the flip-flop FF13 to be latched therein on the leading edge of the clock /10MCK at the time t10.

Additionally, during the time period t9 to the time t10, both the switching devices SW3 and SW4 are switched to their input terminals c. The data $A\cdot H_c$ is input to the input terminals a of the adder ADD from the flip-flop FF13 through the switching device SW3. On the other hand, the data E7 is input to the input terminals b of the adder ADD from the flip-flop FF16 through the switching device SW4 and the exclusive OR gate XOR3. At this time, the ADS signal is at the "L" level. Accordingly, the exclusive OR gate XOR3 and the adder ADD perform addition processing of $(A\cdot H_c)+E7$ and output the results of the operation as data $x_2$. The data $x_2$ is input to the flip-flop FF19 to be latched therein on the leading edge of the clock/10MCK and then, input to the flip-flop FF20 to be latched therein on the leading edge of the clock/5MCK at the time t11.

During the time period t10 to the time t11, both the switching devices SW1 and SW2 are switched to their input terminals a. The data A is input to the input terminals a of the multiplier MPY from the flip-flop FF1 through the switching device SW1. On the other hand, the $H_c$ is input to the input terminals b of the multiplier MPY from the HV counter 31 through the exclusive OR gate XOR1 and the switching device SW2. The multiplier MPY performs an operation of data $A\cdot H_c$ and outputs the results of the operation. The data $A\cdot H_c$ is input to the flip-flop FF13 to be latched therein on the leading edge of the clock/10MCK at the time t11.

Furthermore, during the time period t10 to the time t11, the switching devices SW3 and SW4 are respectively switched to its input terminals c and its input terminals d. The data $C\cdot H_c$ is input to the input terminals a of the adder ADD from the flip-flop FF13 through the switching device SW3. On the other hand, the data E8 is input to the input terminals b of the adder ADD from the flip-flop FF17 through the switching device SW4 and the exclusive OR gate XOR3. At this time, the ADS signal is at the "L" level. Accordingly, the exclusive OR gate XOR3 and the adder ADD perform addition processing of $(C\cdot H_c)+E8$ and outputs the results of the operation as data $y_2$. The data $y_2$ is input to the flip-flop FF18 to be latched therein on the leading edge of the clock/5MCK at the time t11.

The data $x_2$ in the case of $H_c=0$ is calculated in the above described time period from the time t9 to the time t10, and the data $y_2$ in the case of $H_c=0$ is calculated in the time period from the time t10 to the time t11. In a time period after the time t11, the data $x_2$ and $y_2$ in a case where the data $H_c$ is 1 to 255 are calculated in the same manner, to calculate the data $x_2$ and $y_2$ of one scanning line.

At the time t11, as shown in FIG. 10, an AE signal output from the timing signal generator 30 falls to a low level. On this occasion, the tri-state buffer amplifiers BA1 to BA6 are enabled. Consequently, during the time period t11 to the time t13, an address CAA0 of a total of 16 bits comprising data of the most significant two bits "00" output from the tri-state buffer amplifier BA1 and data yc and xc of the respective most significant seven bits of the data y2 (10 bits) and the data x2 (10 bits) in the case of $H_c=0$, which are respectively latched in the flip-flops FF18 and FF20, is output to the VRAM 7b through the address bus 15b. The VRAM 7b inputs the address CAA0 at the time t13. The data yd and xd of the respective least significant three bits of the data y2 and x2 in the case of $H_c=0$, which are respectively latched in the flip-flops FF18 and FF20, are latched in the flip-flop FF23 through the flip-flop FF22.

During the time period after the time t13, addresses CAA1 to CAA255 including the data yc and xc in a case where the data $H_c$ is 1 to 255 are periodically repeated and output to the VRAM 7b through the address bus 15b for each period of the clock/5MCK. Furthermore, the data yd and xd corresponding to the respective values of the data $H_c$ are latched in the flip-flop FF23 through the flip-flop FF22 in the above described manner.

The VRAM 7b is responsive to the addresses CAA0 to CAA255 input from the background picture address control circuit 24 through the address bus 15b to output 8-bit character codes CA0 to CA255 stored in the respective addresses to the flip-flop FF21 in the background picture address control circuit 24 through the data bus 16b for each period of the clock/10MCK. The 8-bit character codes CA0 to CA255 are latched in the flip-flop FF21.

On the other hand, the data yd and xd (a total of six bits) corresponding to the character codes are latched in the flip-flop FF23 as described above. Consequently, during the time period t15 to the time t17, a 16-bit address CCA0 comprising data of the most significant two bits "00", a 8-bit character code latched in the flip-flop FF21, and the data yd and xd (a total of six bits) in the case of the data $H_c=0$ is output to the VRAM 7a through the tri-state buffer amplifiers BA4 to BA6 and the address bus 15a. The address CCA0 is input to the VRAM 7a at the time t17.

During time periods from the time t17 on, the addresses CCA1 to CCA255 in a period during which the data $H_c$ is 1 to 255 are output to the VRAM 7a from the background picture address control circuit 24 through the address bus 15a in the same manner.

The VRAM 7a is responsive to the addresses CCA0 to CCA255 input from the background picture address control circuit 24 through the address bus 15a to output the 8-bit color data CD0 to CD255 stored in the respective addresses to the background picture data processing circuit 25 through the data bus 16b for each period of the clock/10MCK.

The foregoing rotation processing and enlargement or reduction processing of a background picture with respect to one scanning line are performed with respect to one scanning line are performed with respect to 244 scanning lines of 28 characters, as shown in FIG. 2, thereby making it possible to achieve the rotation processing and the enlargement or reduction processing of a background picture with respect to one display screen area 41.

As described in the foregoing, the background picture address control circuit 24 calculates the addresses CAA0 to CAA255 in which character codes of a background picture at the time of rotation and enlargement or reduction are stored on the basis of the constant data A, B, C and D for rotation processing and enlargement or reduction processing which are input from the CPU2 and outputs the addresses. The control circuit 24 outputs, in response to the addresses, the addresses CCA0 to CCA255 each comprising the character code (8 bits) output from the VRAM 7b and the data yd and xd, thereby to make it possible to output the color data of 8 bits per dot at the time of rotation processing and enlargement or reduction processing to the background picture data processing circuit 25 from the VRAM 7a. Thereafter, the color data (8 bits) of the background picture is latched in the background picture data processing circuit 25 and then, input to the priority control circuit 26.

The 7-bit moving picture data is input from the moving picture data processing circuit 23 to the priority control circuit 26. The priority control circuit 26 is responsive to the moving picture data so as to determine the priority between the moving picture data and the background picture data on the basis of the 2-bit priority data included in the moving picture data and outputs higher-priority data of the moving picture data and the background picture data to the color signal generator 28. The color generator 28 is responsive to the higher-priority data for converting the moving picture data or the background picture data as [inputted] input into a digital signal of RGB of 5 bits for each color and outputting the digital signal of RGB to the display device 8 and the NTSC encoder 29 on the basis of the count data $H_c$ and $V_c$ applied from the HV counter 31. Consequently, by the foregoing processing, a background picture obtained by rotating and enlarging or reducing the original background picture corresponding to the background picture data stored in the VRAM 7 on the basis of an angle of rotation $\gamma$ and scaling magnification $\alpha$ and $\beta$ for the rotation processing and the enlargement or reduction processing which are input from the CPU 2 is displayed on the display device 8.

Figure 11:
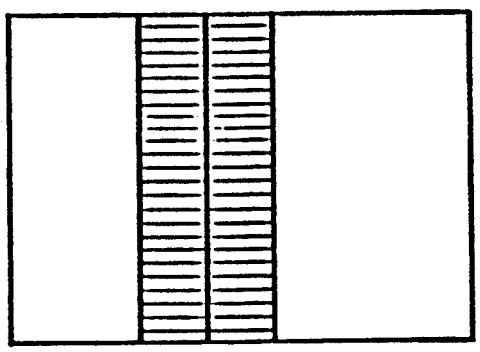
FIG. 11 is a schematic diagram showing an example of the display of an original background picture.

Consequently, in the present embodiment, a three-dimensional background or a background which looks as if the road is curved as shown in each of FIGS. 12 to 16 can be displayed on the basis of one background picture data for displaying a two-dimensional background picture as shown in, for example, FIG. 11. Further, in a case where the present invention is applied to, for example, a simulation game, if the enlargement or reduction processing is performed while the rotating a background picture as a preferred embodiment, a background can be displayed which looks like a map viewed from the runway and the air which turns as an airplane takes off (moves away) and lands (approaches) by displaying the background screen in such a three-dimensional manner, thereby to make it possible to further improve the representation of the background picture.

Figure 12:
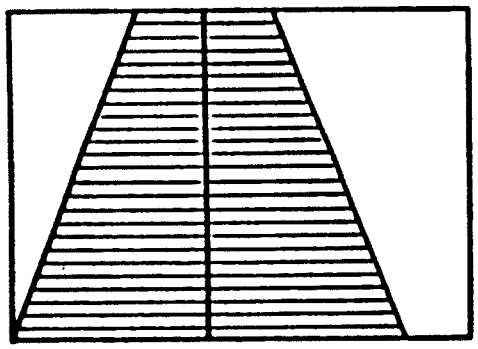

When the original background picture as shown in FIG. 11 is changed into a background picture as shown in FIG. 12, no rotation processing is performed. In this case, it is necessary that the scaling magnification $\alpha$ in the x direction of the parameter A in the equation (10) is increased with lower parts of the screen. In this case, however, no enlargement or reduction processing in the y direction is performed. Accordingly, the scaling magnification $\beta$ in the y direction of the parameter D in the equation (12) may remain constant.

Figure 13:
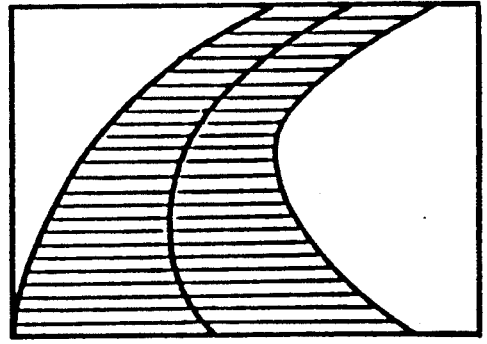

When the original background picture as shown in FIG. 11 is changed into a background picture as shown in FIG. 13, a scroll offset value $H_p$ in the x direction is changed for each line and enlargement processing in the x direction is performed. In this case, it is necessary that the parameter $x_1$ in the equation (13) is sequentially altered and the scaling magnification $\alpha$ in the x direction of the parameters A and B in the equations (2) and (3) is increased with lower parts of the screen. In this case, however, no enlargement or reduction processing in the y direction is performed. Accordingly, the scaling magnification $\alpha$ in the y direction of the parameters C and D in the equations (4) and (5) may remain constant.

When the original background picture as shown in FIG. 11 is changed into a background picture as shown in FIG. 14, enlargement processing in the y direction is performed. In this case, it is necessary that the scaling magnification $\beta$ in the y direction of the parameter D in the equation (12) is increased with lower parts of the screen. In this case, however, no enlargement or reduction processing in the x direction is performed. Accordingly, the scaling magnification $\alpha$ in the x direction of the parameter A in the equation (10) may remain constant.

When the two-dimensional original background picture as shown in FIG. 11 is changed into a three-dimensional background picture as shown in FIG. 15, processing shown in FIG. 13 and processing shown in FIG. 14 are combined. More specifically, in this case, it is necessary that the scaling magnification $\alpha$ in the x direction of the parameter A in the equation (10) is increased with lower parts of the screen and at the same time, the scroll offset value $H_p$ is changed for each line to sequentially alter the parameter $x_1$ in the equation (13), and the scaling magnification $\alpha$ in the y direction of the parameters C and D in the equations (4) and (5) is increased with lower parts of the screen.

The rotation processing will be further described in connection with FIG. 16. If it is desired to divide one screen into a plurality of parts (three in FIG. 16) in the vertical direction in one frame period and alternately change to 45° the directions of rotation of parts of the original background picture shown in FIG. 11 as shown in, for example, FIG. 16, it is necessary to switch an angle $\gamma$ of the parameter A in the equations (2) to (5) for each vertical coordinate position where the screen is to be divided.

Meanwhile, if it desired to rotate the original background picture shown in FIG. 11 without any modification, the angle $\gamma$ of the parameter A in the equation (2) and (5) may be gradually changed by a constant value for each frame. In this case, however, the illustration of this state is difficult and thus, is omitted.

As described in the foregoing, an address of the VRAM 7 in a case where the original background picture corresponding to the background picture data stored in the VRAM 7 is rotated and enlarged or reduced is calculated by the background picture address control circuit 24, the color data of the background picture at the time of the rotation processing and the enlargement or reduction processing is read from the VRAM 7 to generate a video signal, and the video signal is displayed on the display device 8. Accordingly, the CPU 2 must only set constants but need not calculate respective positions of a picture which is rotated and enlarged or reduced. Accordingly, the CPU 2 can perform processing of another image or picture. Consequently, the present invention has the advantage that the throughput of the CPU can be improved, as compared with the prior art for rotation processing or enlargement or reduction processing. In addition, an address of image data of a background picture in the VRAM 7 corresponding to the respective positions in the horizontal and vertical directions of the background picture which is rotated and enlarged or reduced is calculated by the hardware based background picture address control circuit 24 utilizing the switching devices SW1 and SW4, the multiplier MPY and the adder ADD as described above.

Accordingly, the rotation processing and the enlargement or reduction processing can be performed at higher speed, as compared with the prior art. Moreover, various circuits in one background picture address control circuit 24 achieve the rotation processing or the enlargement processing or the reduction processing in a time shared manner. Accordingly, the circuit configuration is simplified and the cost is lowered, as compared with a case where a dedicated circuit is provided for each processing.

Furthermore, since in the picture processing unit 1, an address of image data of a background picture which is rotated and enlarged or reduced is calculated to find background picture data, the original background picture data can be preserved. Consequently, there is no possibility that computing errors at the time of respective rotations are accumulated as in the conventional example when an image is rotated once so that a background picture is displayed in a position different from that of the original background picture and the shape of the background picture is changed from that of the original background picture.

Although in the above described embodiments, description was made of the video processing unit 1 for rotating and enlarging or reducing a background picture and display the same, the present invention is not limited to the same. For example, the video processing unit may be constructed to perform at least one of rotation processing and enlargement or reduction processing. The construction of the background picture address control circuit 24 need not be changed. The constants $\alpha$ and $\beta$ calculated by the CPU 2 may be 0 if only the rotation processing is performed, and the constant $\beta$ calculated by the CPU 2 may be 0 if only the enlargement or reduction processing is performed.

Furthermore, although in the above embodiment, a description was made of a character type video processing apparatus, the present invention is not limited to the same. It should be noted that the present invention is applicable to a so-called dot map type video processing apparatus for designating an address for each dot to obtain color data using a VRAM having color data corresponding to the VRAM area 40.

Although the present invention has been described and illustrated in detail, it is clearly understood that the same is by way of illustration and example only and is not to be taken by way of limitation, the spirit and scope of the present invention being limited only by the terms of the appended claims.

We claim:

1. A video processing apparatus which displays a background picture, on display means having a display screen, composed of a plurality of pixels in a horizontal direction and a vertical direction, respectively, comprising:

position data generating means for generating first position data representative of a position in said horizontal direction and said vertical direction on said display screen;

parameter data applying means for applying parameter data for rotation of said background picture, said parameter data being sequentially changed within an angular range by which said background picture is to be rotated;

position data operation means for operating on second position data after performing said rotation on said display screen on the basis of said first position data and said parameter data;

first storage means for storing a plurality of character codes representative of a plurality of characters each composed of a plurality of pixels, said position operation means operating on said second position data for each of said plurality of pixels;

first reading means for generating a reading address for reading said character code from said first storage means on the basis of said second position data operated on by said position data operation means;

second storage means for storing color data of respective pixels constituting said character, said character having a plurality of pixels;

second reading means for reading said color data from said second storage means on the basis of the character code read by said first reading means and said second position data; and video signal generating means for generating a video signal on the basis of the color data read by said second reading means.

2. A video processing apparatus for displaying a background picture, on display means having a display screen, composed of a plurality of pixels in a horizontal direction and a vertical direction, respectively, comprising:

position data generating means for generating first position data representative of a position in said horizontal direction and said vertical direction on said display screen;

parameter data applying means for applying parameter data for at least one of rotation, enlargement and reduction of said background picture, said parameter data for rotation being sequentially changed within an angular range by which said background picture is to be rotated;

position data operation means for operating on second position data, on the basis of said first position data and said parameter data, after performing said at least one of rotation, enlargement and reduction on said display screen;

first storage means for storing a plurality of character codes representative of a plurality of characters each composed of a plurality of pixels, said position operation means operating on said second position data for each of said plurality of pixels;

first reading means for generating a reading address for reading said character code from said first storage means on the basis of said second position data operated on by said position data operation means;

second storage means for storing color data of respective pixels constituting said character, said character having a plurality of pixels;

second reading means for reading said color data from said second storage means on the basis of the character code read by said first reading means and said second position data; and video signal generating means for generating a video signal on the basis of the color data read by said second reading means.

3. A video processing apparatus in accordance with claim 1 or 2, wherein said first reading means accesses said first storage means on the basis of a portion of said second position data, and said second reading means accesses said second storage means on the basis of said character data and a remaining portion of said second position data.

4. A video processing apparatus in accordance with claim 2, wherein said parameter data applying means generates parameter data (A, B, C, D), and said position data generating means generates said first position data $(x_0, y_0)$, and said position data operation means includes center coordinate data generating means for generating center coordinate data $(x_0, y_0)$ for at least one of said rotation, enlargement and reduction, and matrix operation means for performing a matrix operation according to the following equation on the basis of said first position data $(x_1, y_1)$ and said center coordinate data $(x_0, y_0)$ to evaluate said second position data $(x_2, y_2)$ of the pixels after performing at least one of said rotation, enlargement and reduction on said display screen:

$$\begin{bmatrix} X_2 \\ Y_2 \end{bmatrix} = \begin{bmatrix} A & B \\ C & D \end{bmatrix} \begin{bmatrix} X_1 - X_0 \\ Y_1 - Y_0 \end{bmatrix} + \begin{bmatrix} X_0 \\ Y_0 \end{bmatrix}$$

wherein, if a scaling factor in said horizontal direction for enlargement or reduction is $\alpha$, a scaling factor in said vertical direction for enlargement or reduction is $\beta$, and an angle to be rotated is $\gamma$, said parameter data A, B, C and D are respectively given by the following equations:

$A = 1/\alpha \cdot \cos\gamma$ $B = 1/\alpha \cdot \sin\gamma$ $C = -1/\beta \cdot \sin\gamma$ $D = 1/\beta \cdot \cos\gamma.$ 5. A video processing apparatus in accordance with claim 3, wherein said first position data generating means generates said first position data $(x_1, y_1)$ represented by $x_1 = H_p + H_c$ and $y_1 = V_p + V_c$ when offset data in said horizontal direction and said vertical direction are $H_p$ and $V_p$ and position data of said pixel in said horizontal direction and said vertical direction are $H_c$ and $V_c$.

6. A video processing apparatus in accordance with claim 4, wherein said display means includes a raster scan display, and said operation means performs a portion of said matrix operation necessary for a next horizontal scanning period of said raster scan display during a horizontal blanking period and performs a remaining portion of said matrix operation operation during said next horizontal scanning period for each pixel.

7. A video processing apparatus in accordance with claim 6, wherein said first storage means including a storage area larger than a size of said display screen of said raster scan display, and said data generating means includes means for generating data for designating character data of a character to be displayed out of the characters stored in said first storage means.

8. A video processing apparatus in accordance with claim 5, wherein said operation means operates on said second position data $(x_2, y_2)$ according to the following equations:

$$x_2 = A(H_p - x_0) + B(V_p - y_0) + x_0 + A \cdot H_c + B \cdot V_c$$

$$y_2 = C(H_p - x_0) + D(V_p - y_0) + x_0 + C \cdot H_c + D \cdot V_c.$$

9. A video processing apparatus in accordance with claim 8, wherein said display means includes a raster scan display, said operation means performs terms "$+A \cdot H_c$" and "$+C \cdot H_c$" of said equations for each pixel during a horizontal scanning period of said raster scan display, and performs a remaining portion of said equations necessary for said horizontal scanning period during a horizontal blanking period before said horizontal scanning period.

10. A video processing apparatus which displays a background picture, on a raster scan display having a display screen, composed of a plurality of pixels in a horizontal direction and a vertical direction, respectively, comprising:
   storage means for storing an image data of said background picture in an address corresponding to a display position of said background picture;
   matrix operation means for performing a matrix operation for at least one of rotation, enlargement and reduction of said background picture, said matrix operation means performing an operation of a portion of said matrix operation necessary for a next horizontal scanning period of said raster scan display during a horizontal scanning period and an operation of a remaining portion of said matrix operation for each pixel during said next horizontal scanning period;
   reading means for reading said image data from said storage means on the basis of operation results by said matrix operation means; and
   video signal generating means for generating a video signal on the basis of the image data read by said reading means.

11. A video game system for playing video games which display both moving picture character symbols and a background picture, constituted by at least one of a plurality of background picture character symbols, and each of said character symbols being composed of a plurality of pixels, comprising:
   a game machine including a central processing unit and a picture processing unit coupled to said central processing unit;
   a game cartridge coupled in use to said game machine and including memory means for storing character data representative of a plurality of motion picture characters and background picture characters, and for storing at least one of rotation data, enlargement data, and reduction data respectively representative of an arbitrary rotation angle, enlargement rate, and reduction rate;
   said central processing unit including means for accessing said memory means and for generating background picture processing parameters including at least one of a rotation parameter, enlargement parameter and reduction parameter necessary for operating on a background picture address on the basis of said rotation data, enlargement data, and reduction data;
   said picture processing unit including a background picture address generating circuit for receiving said background picture processing parameters from said central processing unit and for calculating background picture address information for each of said plurality of pixels, whereby a background picture may be displayed in at least one of a rotated, enlarged, and reduced disposition.

12. A video game system in accordance with claim 11 further including a video memory having a first set of memory locations for storing data associated with a background picture to be displayed and a second set of memory locations for storing data associated with moving picture symbols to be displayed.

13. A video game system in accordance with claim 11, wherein said picture processing unit includes moving picture address control circuitry for receiving moving picture attribute data and for generating a video memory address for retrieving moving picture symbols to be displayed.

14. A video game system according to claim 13, said picture processing unit further including a moving picture processing circuit coupled to said moving picture address control circuitry for receiving and temporarily storing moving picture character symbol related data and a background picture processing circuit coupled to said background picture address control circuitry for receiving and temporarily storing background picture related data; a priority circuit for determining priority between moving picture data received from said moving picture processing circuit and background picture data received from said background picture processing circuit and for outputting the higher priority data; and video signal generating means, coupled to said priority circuit, for receiving data to be displayed from said priority circuit and for generating a video signal.

15. A video game signal according to claim 11, wherein said background picture address control circuit is coupled to central processing unit and includes register means for receiving said background picture processing parameters from said central processing unit.

16. A video game system according to claim 11, further including timing means for generating a plurality of timing signals, said background picture address control circuit includes a plurality of registers for storing at least rotation related address information, said registers being loaded in response to predetermined ones of said timing signals.

17. A video game system according to claim 11, wherein said background picture address control circuitry includes means for processing both background picture rotation and enlargement related address information.

18. A video game system according to claim 11, wherein said background picture address control circuitry includes means for processing both background picture rotation and reduction related address information.

19. A video game system according to claim 11, further including a video memory for storing data associated with a background picture to be displayed, wherein said background picture address control circuit calculates a video memory address in response to background picture offset data.

20. A video game system according to claim 11, further including a video memory for storing data associated with a background picture to be displayed, wherein said background picture address control circuit calculates a video memory address in response to background picture character flipping data.

21. A video game system according to claim 19, wherein said background picture offset data is stored in said memory means in said game cartridge.

22. A video game system according to claim 20, wherein said background picture character flipping data is stored in said memory means in said game cartridge.

23. A video game system according to claim 11, further including timing means for generating a first set of timing signals defining a preliminary processing time period during which no video signal is output from the picture processing unit and a second set of timing signals defining a real-time processing period during which a video signal is displayed, wherein said background picture address control circuit is operable to perform rotation related address processing in response to said second set of timing signals.

24. A video game system according to claim 23, wherein said background picture address control circuit is operable to calculate rotation related constants in response to said first set of timing signals.

25. A video game system according to claim 11, wherein said memory means in said game cartridge includes means for storing program information defining the type of character to be displayed, the time the character is to be displayed, and the coordinate position at which the character is to be displayed.

26. A video game system according to claim 11, wherein said memory means in said game cartridge includes means for storing: character attribute data including character horizontal and vertical position data for designating character horizontal and vertical display positions, a character code for designating the type of character, character color data, a flip code for designating the display of a character reversed in the vertical and horizontal directions, and priority data for designating priority between a moving picture character and a background picture character.

27. A video game system according to claim 11 further including a video memory, wherein said memory means in said game cartridge includes means for storing character related data including color data, and a character code for designating which background character is to be written into said video memory and at which locations in the video memory that background character is to be written.

* * * * *